United States Patent

Cheng

[11] Patent Number: 6,119,330
[45] Date of Patent: Sep. 19, 2000

[54] FULLY AUTOMATIC CUTTING METAL-WORKING MACHINE

[76] Inventor: Chin Chung Cheng, 58, Chien Kuo Road, Lu Chu Hsiang, Kaohsiung Hsien, Taiwan

[21] Appl. No.: 09/296,048

[22] Filed: Apr. 21, 1999

[51] Int. Cl.[7] .............................. B23Q 7/02; B23B 9/00
[52] U.S. Cl. .......................... 29/563; 29/33 J; 29/38 B; 29/38 C; 29/564
[58] Field of Search .................. 29/38 A, 38 B, 29/38 C, 563, 564, 27 C, 33 J, 27 R, 33 P; 82/120, 121, 124, 129

[56] References Cited

U.S. PATENT DOCUMENTS

| | | | |
|---|---|---|---|
| 3,698,061 | 10/1972 | LaValle | 29/564 |
| 4,163,313 | 8/1979 | Matsuno et al. | 29/563 |
| 4,301,581 | 11/1981 | Bader | 29/38 C |
| 4,520,595 | 6/1985 | Diener | 29/38 C X |
| 4,602,417 | 7/1986 | Mesch | 29/564 |
| 4,669,161 | 6/1987 | Sekelsky, Jr. | 29/33 P |
| 4,751,361 | 6/1988 | Inoue et al. | 29/563 X |
| 4,987,765 | 1/1991 | Nishimura et al. | 29/33 J X |
| 5,083,364 | 1/1992 | Olbrich | 29/564 |
| 5,332,405 | 7/1994 | Golomb | 29/33 Q X |
| 5,361,486 | 11/1994 | Harmsen | 29/563 |
| 5,640,756 | 6/1997 | Brown | 29/33 J X |
| 5,815,902 | 10/1998 | Osterried et al. | 29/38 A |

*Primary Examiner*—William Briggs
*Attorney, Agent, or Firm*—Pro-Techtor International Services

[57] ABSTRACT

A fully automatic cutting metal-working machine, which includes a material feed unit, a cutting metal-working main unit controlled to process metal rod material delivered from the material feed unit into finished products, and a waste material conveyer controlled to collect and carry waste material out of the cutting metal-working main unit, wherein the cutting metal-working main unit includes a machine base, a casing mounted on the machine base, a material cut-off shaft assembly controlled to cut metal rod material from the material feed unit into individual workpieces, a plurality of processing shaft assemblies mounted around the casing, a rotary center fixture holder mounted within the casing at the center and controlled to carry workpiece to each of the processing shaft assemblies in proper order to receive a respective processing procedure, and a steering shaft assembly controlled to reverse the position of workpiece at each fixture.

6 Claims, 28 Drawing Sheets

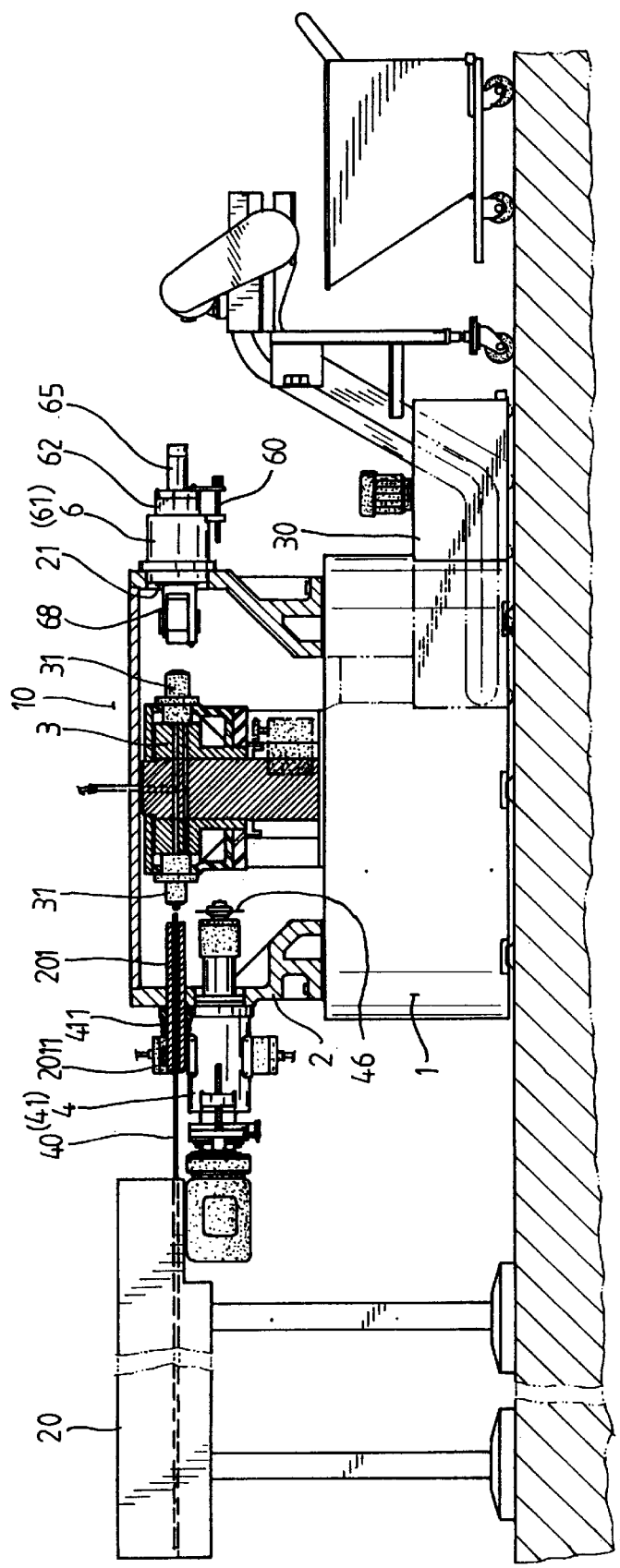
F I G. 1

FIG·13

FULLY AUTOMATIC CUTTING METAL-WORKING MACHINE

BACKGROUND OF THE INVENTION

The present invention relates to a cutting metal-working machine, and more particularly to a fully automatic cutting metal-working machine which automatically cuts inputted metal rod material into individual workpieces, and then carries individual workpieces one after another to different processing shaft assemblies to receive different processing procedures, enabling individual workpieces to be automatically processed into finished products.

Following fast development of high technology, a variety of sophisticated cutting-metal working machines have been disclosed for processing metal materials into different finished products (for example, metal fittings, pipe connectors, three-way valve connectors, valve heads, etc.). In order to save manufacturing time and cost of manpower, a fully automatic manufacturing design is required. However, because different cutting metal-working machines may be needed when fabricating a particular metal product., it is difficult to arrange different cutting metal-working machines into a fully automatic manufacturing line. Further, when a manufacturing line is set for fabricating a particular metal item, it cannot be used for fabricating another metal item. Because fabricating a particular metal item usually requires several processing processes (drilling, tapering, milling, grinding, etc.), it is difficult to arrange a conveyer system in a fully automatic manufacturing line to carry workpieces from one cutting metal-working machine to another.

SUMMARY OF THE INVENTION

The present invention has been accomplished under the circumstances in view. It is therefore the main object of the present invention to provide a fully automatic cutting metal-working machine which automatically cuts inputted metal rod material into individual workpieces, and then carries individual workpieces one after another to different processing shaft assemblies to receive different processing procedures, enabling individual workpieces to be automatically processed into finished products. It is another object of the present invention to provide a fully automatic cutting metal working machine which enables the user to conveniently replace used processing shaft assemblies subject to the metal items to be fabricated. According to one aspect of the present invention, the fully automatic cutting-metal working comprises a material feed unit, a cutting metal-working main unit controlled to process metal rod material delivered from the material feed unit into finished products, and a waste material conveyer controlled to collect and carry waste material out of the cutting metal-working main unit, wherein the cutting metal-working main unit comprises a machine base, a casing mounted on the machine base, a material cut-off shaft assembly controlled to cut metal rod material from the material feed unit into individual workpieces, a plurality of processing shaft assemblies mounted around the casing, a rotary center fixture holder mounted within the casing at the center and controlled to carry each workpiece to each of the processing shaft assemblies in proper order to receive a respective processing procedure, and a steering shaft assembly controlled to reverse the position of each workpiece at each fixture. According to another aspect of the present invention, the processing shaft assemblies are replaceably mounted in equiangularly spaced through holes around the casing, and locked by respective lock means. By means of unlocking the respective lock means, the processing shaft assemblies can be removed from the casing for a replacement.

BRIEF DESCRIPTION OF THE DRAWINGS

FIG. 1 is a front plain view of a fully automatic cutting metal-working machine according to the present invention.

DETAILED DESCRIPTION OF THE PREFERRED EMBODIMENT

Figure 2:
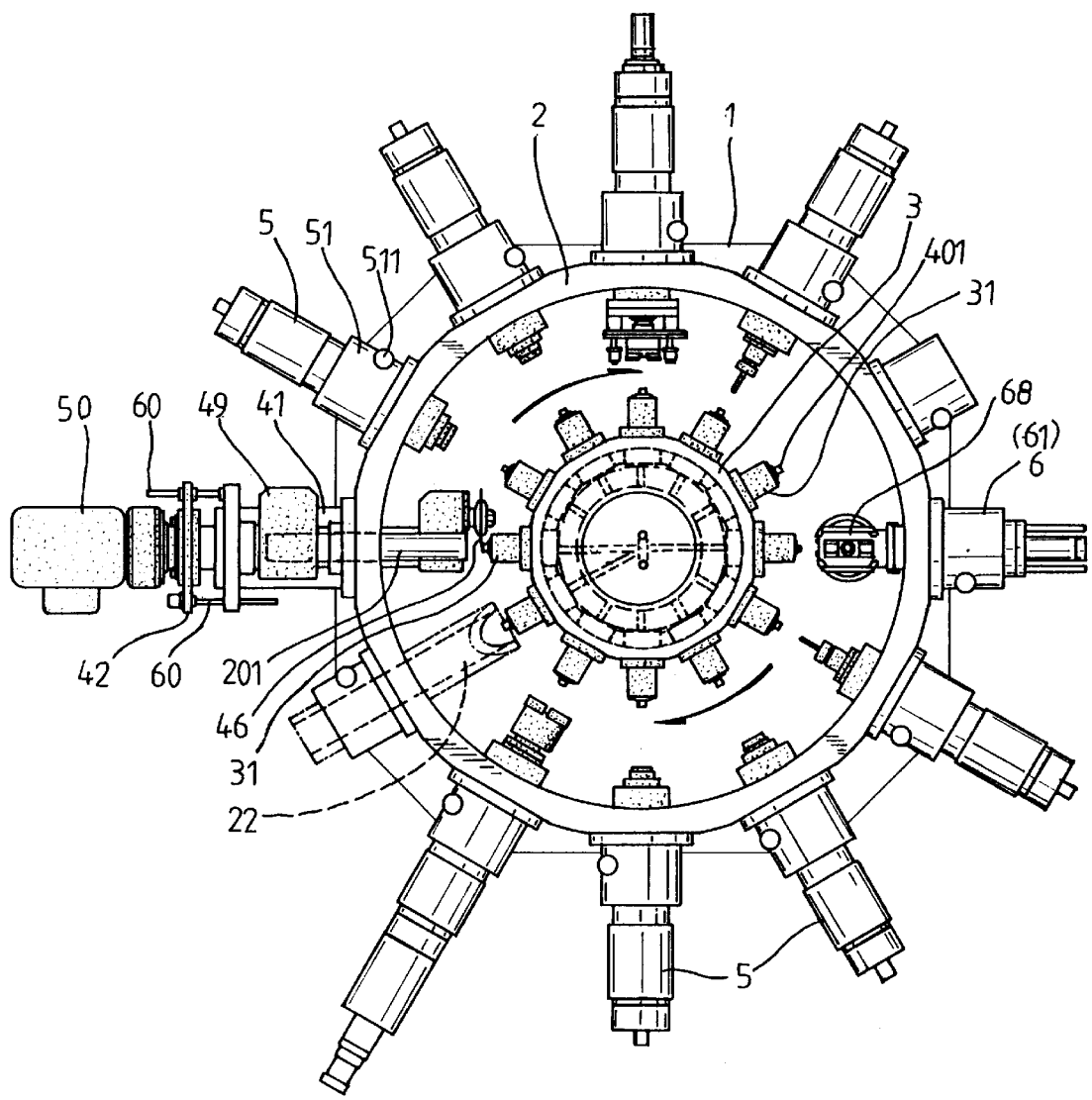
FIG. 2 is a top plain view in an enlarged scale of the circular cutting metal-working main unit of the fully automatic cutting metal-working machine shown in FIG. 1.

Referring to FIG. 1, a fully automatic cutting metal-working machine in accordance with the present invention is generally comprises a circular cutting metal-working main unit 10, a material feed unit 20, a waste material conveyer 30, and a control box (not shown). The material feed unit 20 comprises a forwardly extended feed pipe 201 at its front side. The cutting metal-working main unit 10 comprises a machine base 1, a casing 2, a rotary center fixture holder 3, a material cut-off shaft assembly 4, a set of processing shaft assemblies 5, and a steering shaft assembly 6. The material cut-off shaft assembly 4 and the processing shaft assemblies 5 each are equipped with a motor 50, which provides the necessary working power.

The machine base 1 has a hollow, cylindrical structural. The waste material conveyer 30 extends into the inside of the machine base 1 to collect waste material produced during the operation of the cutting metal-working machine.

The casing 2 is fixedly mounted on the machine base 1 at the top. The shape of the casing 2 fits the machine base 1. Through holes 21 are provided at the casing 2 around its peripheral wall to receive the material cut-off shaft assembly 4, the processing shaft assemblies 5, and the steering shaft assembly 6. One of the through holes 21 serves as a finished product output port 22.

Figure 3:
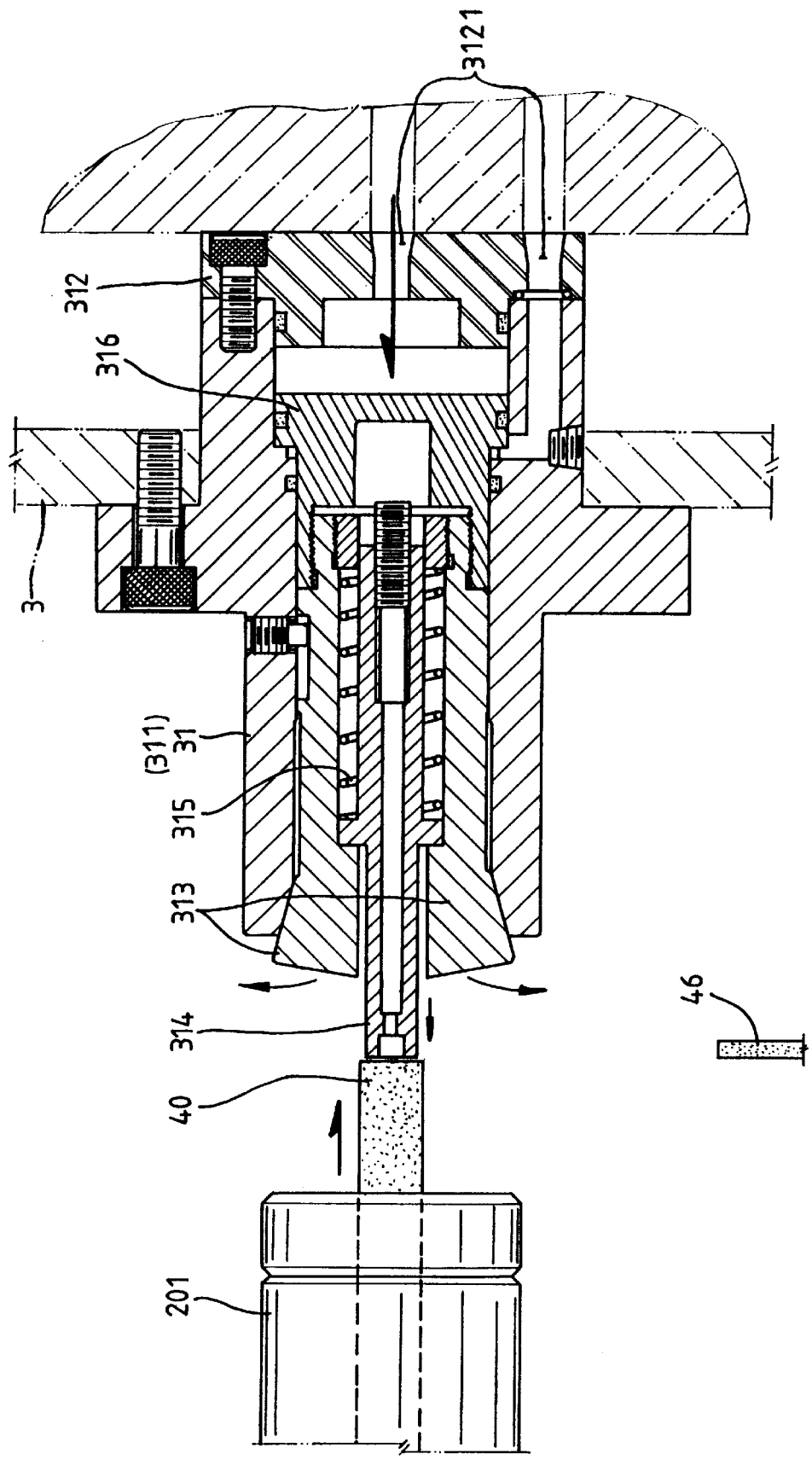
FIG. 3 is sectional view in an enlarged scale of a part of the rotary center fixture holder of the fully automatic cutting metal-working machine shown in FIG. 1, showing the split collar released.
Figure 4:
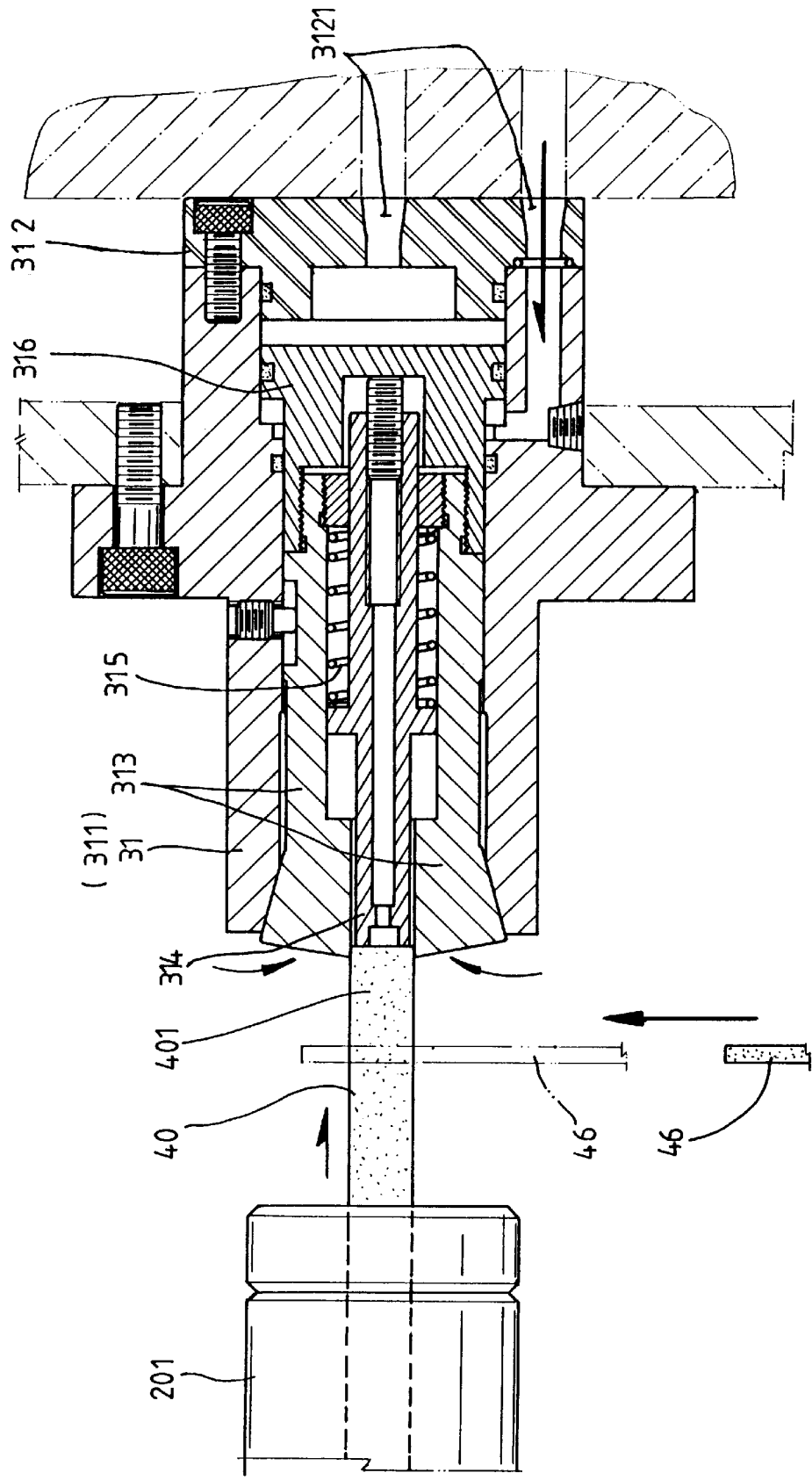
FIG. 4 is similar to FIG. 3 but showing the metal rod material secured to the split collar, the cutting tool operated.
Figure 5:
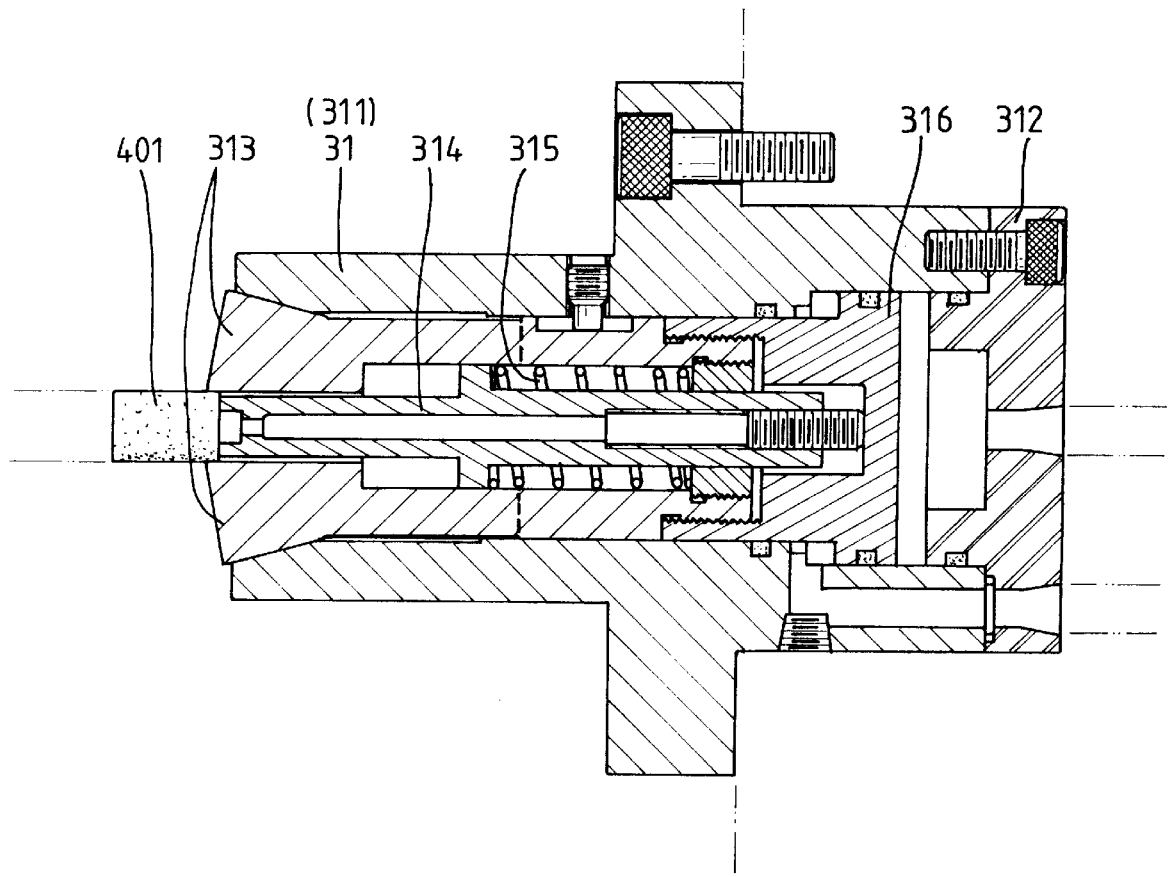
FIG. 5 is a sectional view in an enlarged scale of one fixture of the rotary center fixture holder of the fully automatic cutting metal-working machine, showing the metal rod material secured to the split collar.
Figure 6:
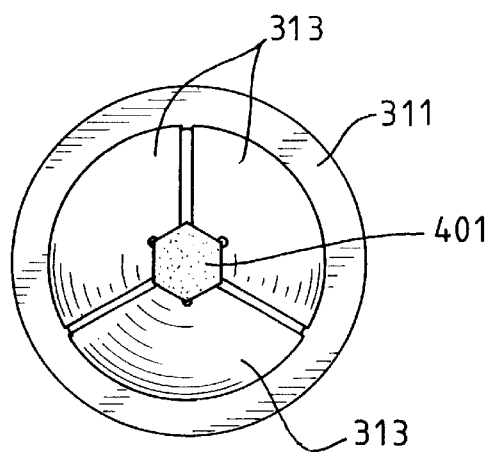
FIG. 6 is a front end view of the fixture shown in FIG. 5.
Figure 7:
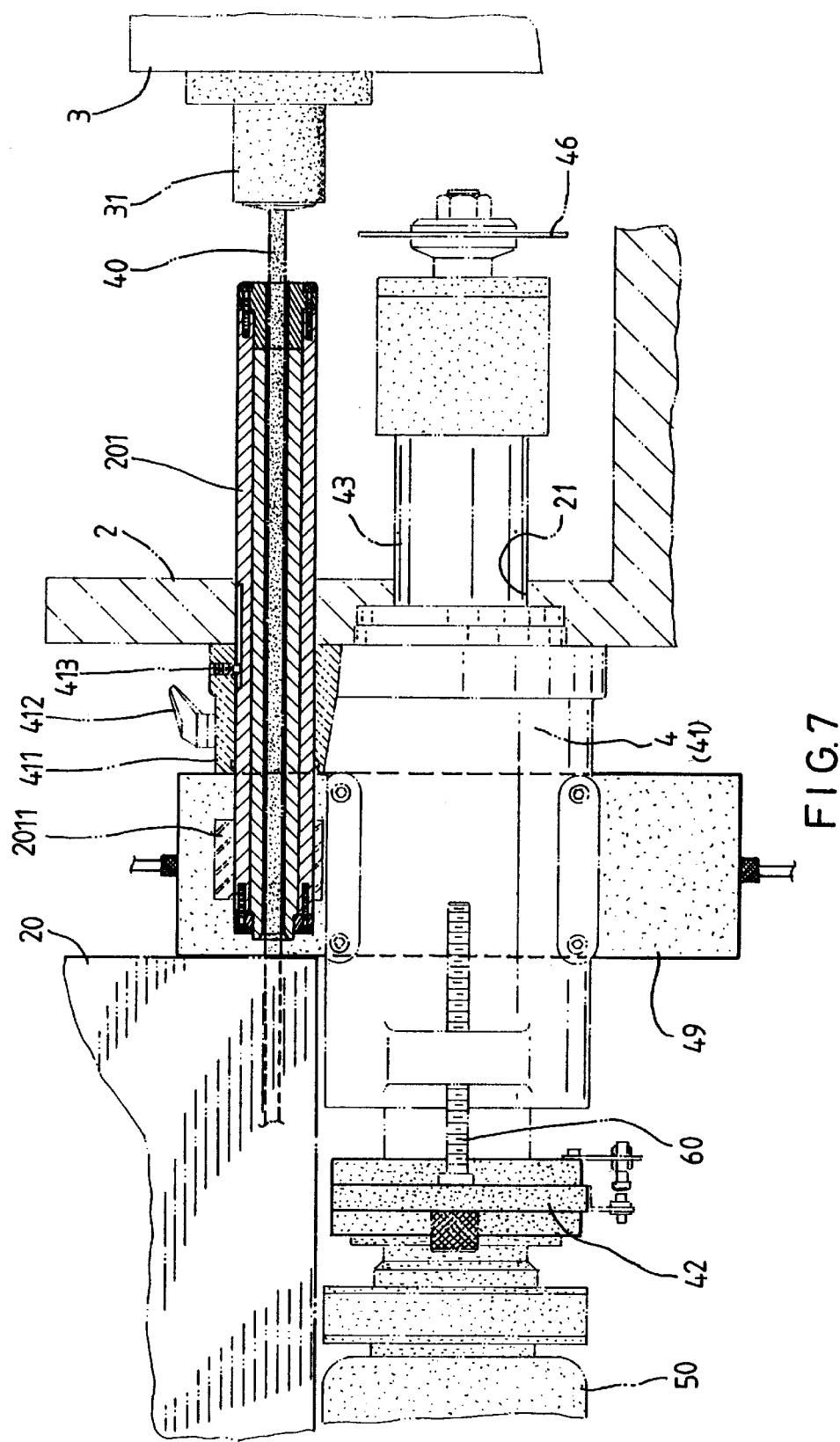
FIG. 7 is a sectional side view in an enlarged scale of a part of the present invention, showing the structure of the material feed unit and the positioning of the feed pipe in the material cut-off shaft assembly.
Figure 8:
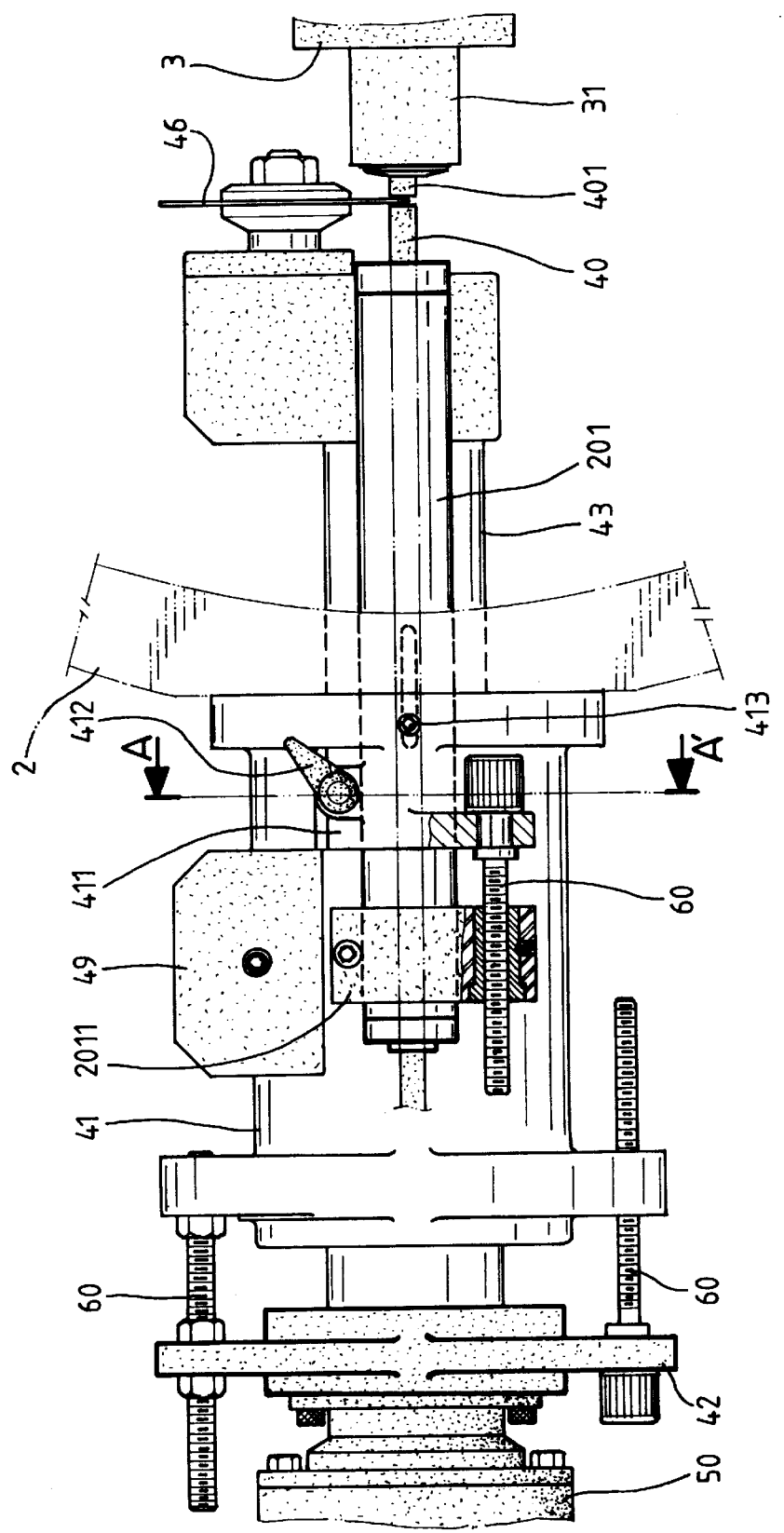
FIG. 8 is a top plain view in an enlarged scale of FIG. 7.
Figure 9:
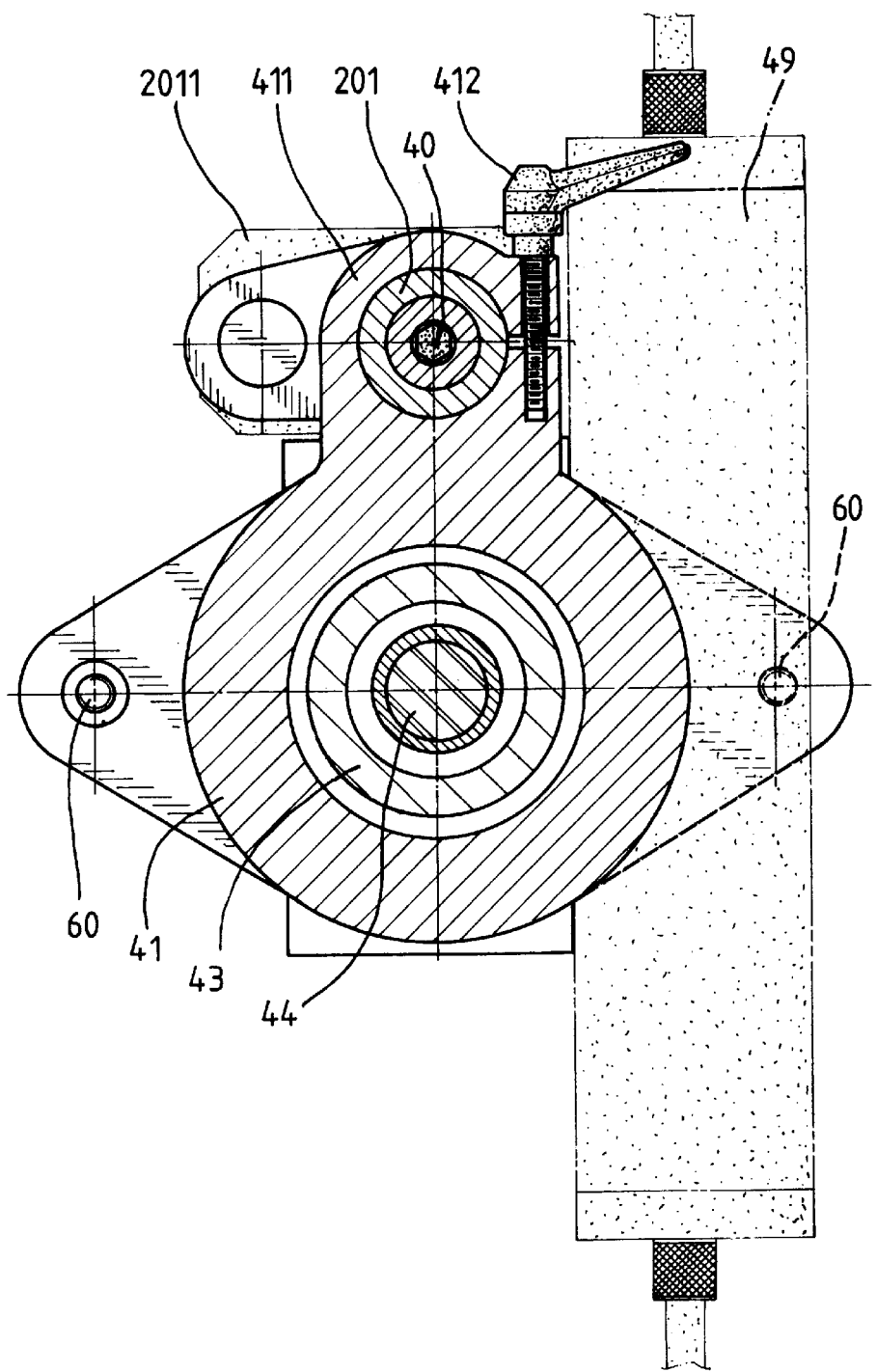
FIG. 9 is a sectional view taken along line A–A' of FIG. 8.
Figure 10:
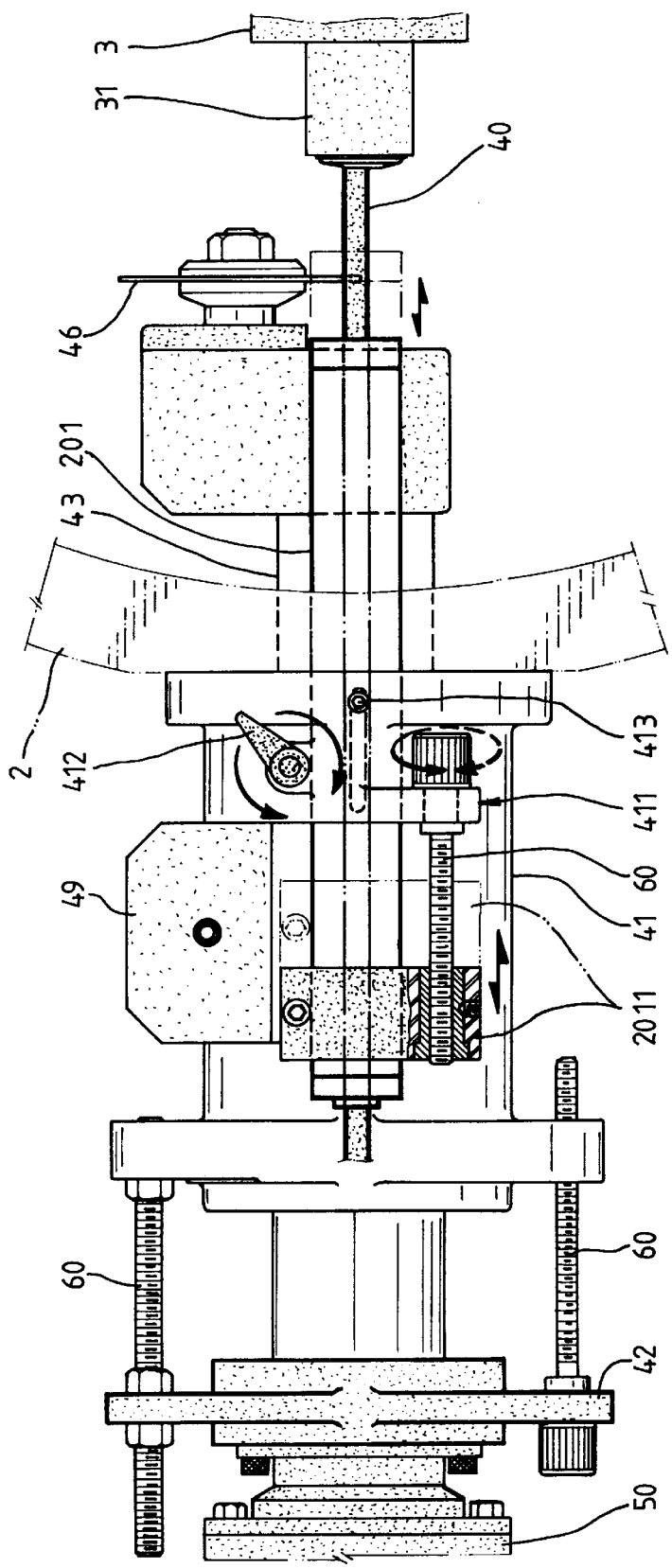
FIG. 10 is similar to FIG. 8 but showing the lock unlocked, the adjustment screw adjusted.

The rotary center fixture holder 3 is mounted inside the casing 2 at the center (see FIGS. 1 and 2), comprising a plurality of fixtures 31 equiangularly spaced around its periphery corresponding to the shaft assemblies 4, 5, and 6. The rotary center fixture holder 3 is rotated step by step to let workpieces 401 which are respectively held on the fixtures 31 be processed or handled by the shaft assemblies 4, 5, and 6. Each of the fixtures 31 is comprised of shell 311, a back cover 312 covered on the back side of the shell 311, a split collar 313 mounted within the shell 311, a center rod 314 mounted within the split collar 313, a spring 315 mounted within the split collar 313 around the center rod 314, and a sliding block 316 mounted within the shell 31 between the split collar 313 and the back cover 312 (see FIGS. from 3 through 6). The back cover 312 comprises a plurality of hydraulic oil holes 3121 through which hydraulic oil is supplied in and out, enabling the sliding block 316 and the split collar 313 to be moved between a first position where the center rod 314 is released from the constraint of the split collar 313 and extended out of the split collar 313 (see FIG. 3), and a second position where the center rod 314 is received inside the split collar 313, enabling the split collar 313 to hold the material to be processed (see FIG. 4). When one fixture 31 is moved to the material cut-off shaft assembly 4, the split collar 313 is extended forwards, a metal rod material 40 is delivered forwards by the material feed unit 20 and inserted into the split collar 313 to push the center rod 314 into the inside of the split collar 313, and to be held down by the split collar 313 of the fixture 31, and then the material rod material 40 is cut, enabling the cut piece to be used as a workpiece 401 (see FIGS. 4 and 5), which is then carried by the fixture 31 to the processing shaft assemblies 5 to receive different processing processed.

Figure 11:
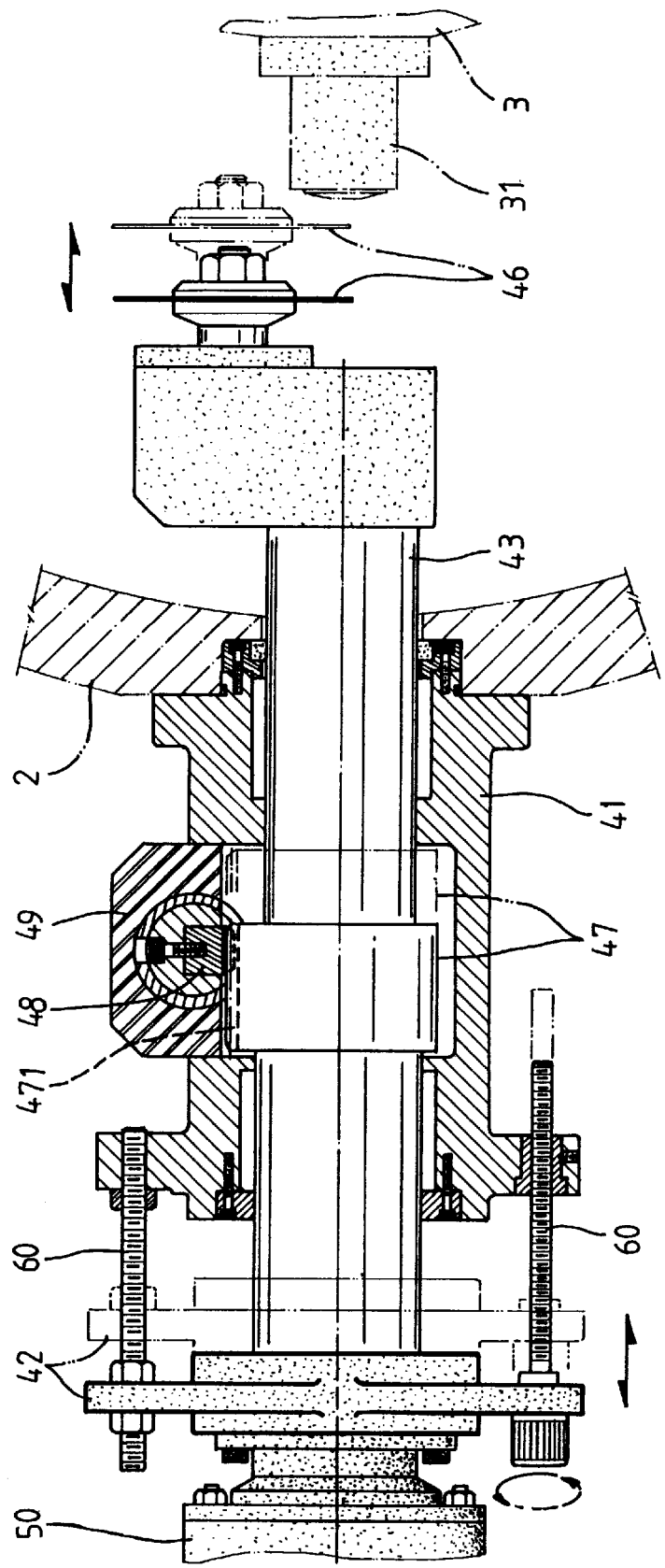
FIG. 11 is an enlarged view of a part of the present invention, showing the material cut-off shaft assembly operated.
Figure 12:
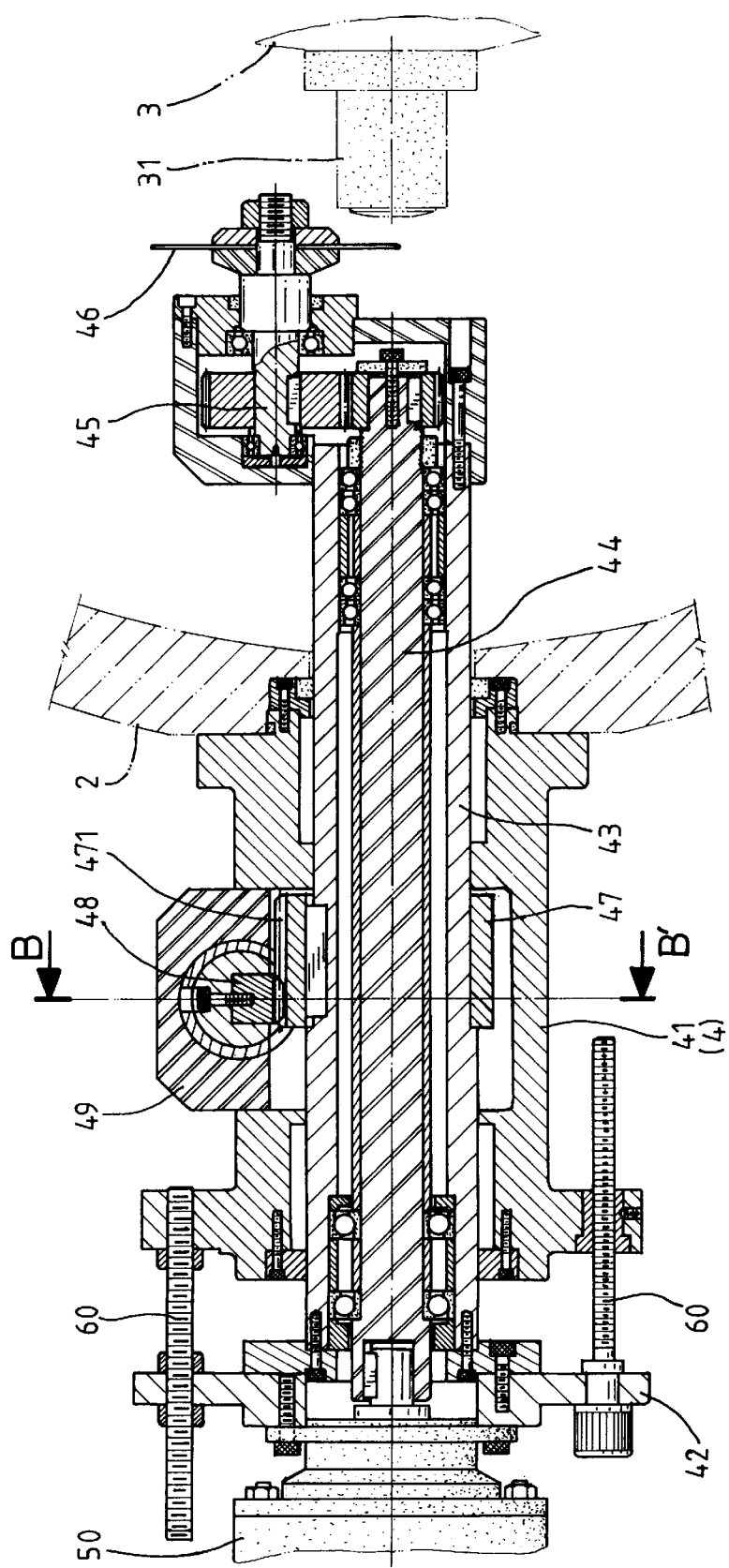
FIG. 12 is a sectional view in an enlarged scale of a part of the present invention, showing the structure of the material cut-off shaft assembly.
Figure 13:
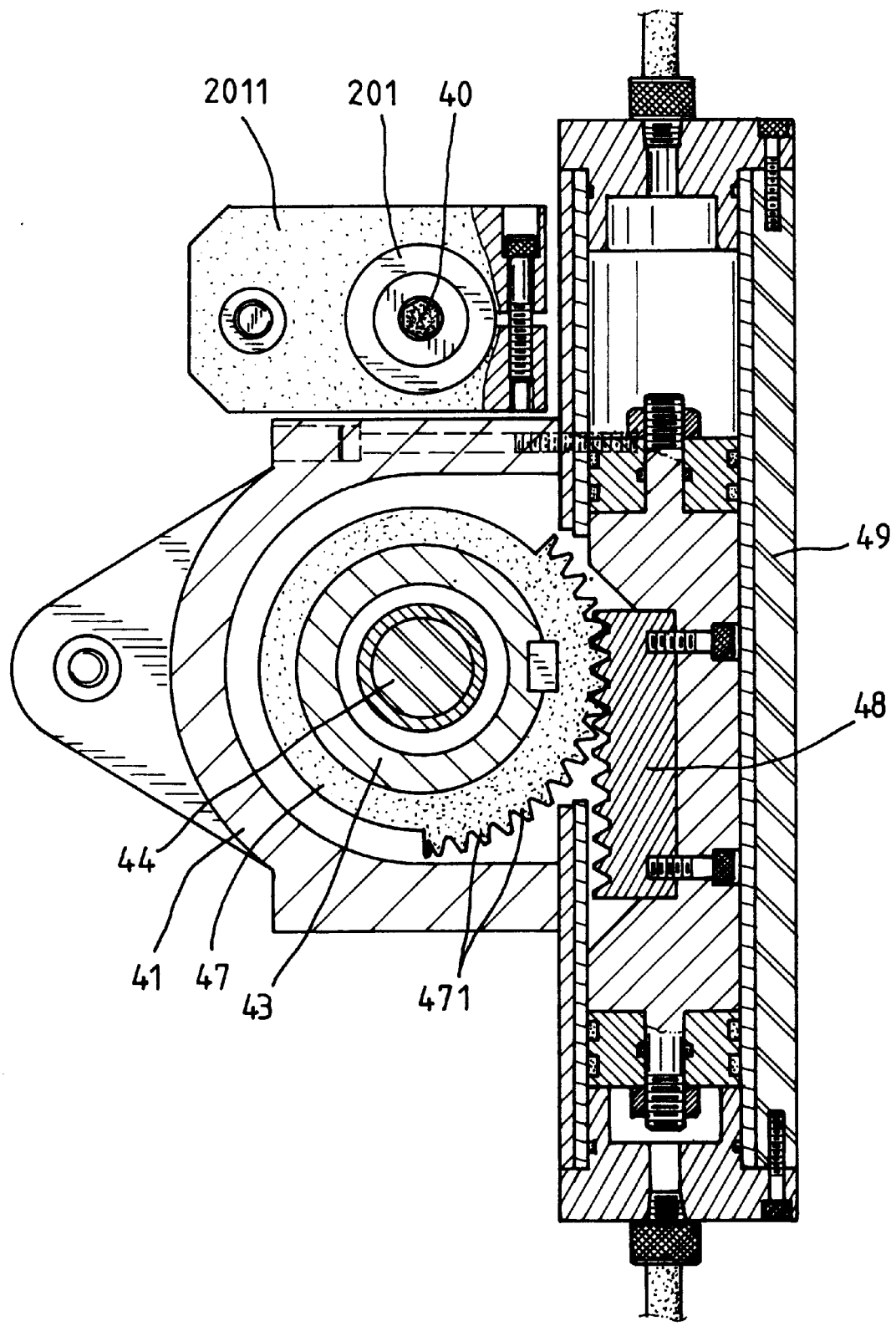
FIG. 13 is a sectional view taken along line B–B' of FIG. 12.
Figure 14:
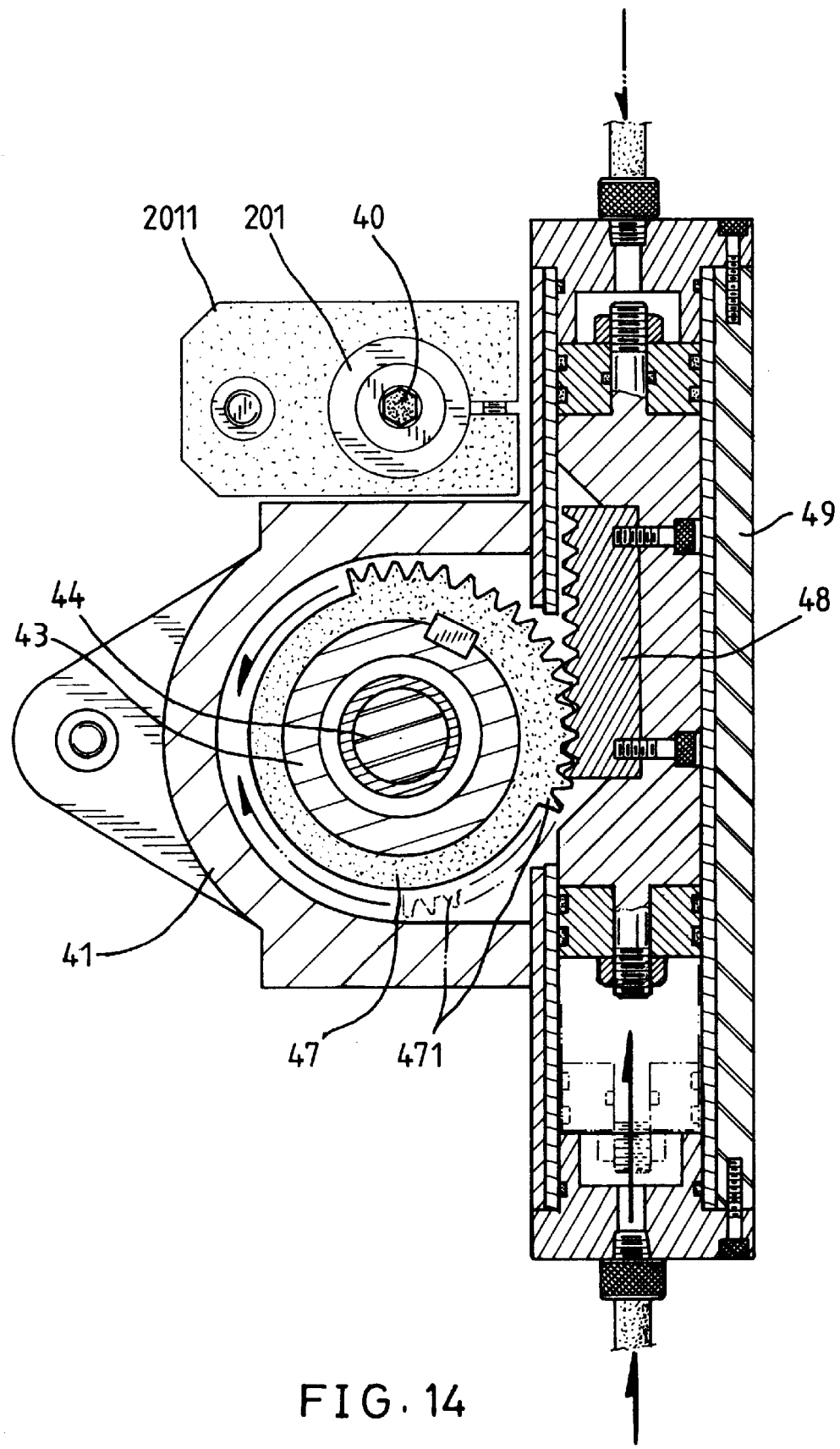
FIG. 14 is similar to FIG. 13 but showing the toothed ring rotated.
Figure 15:
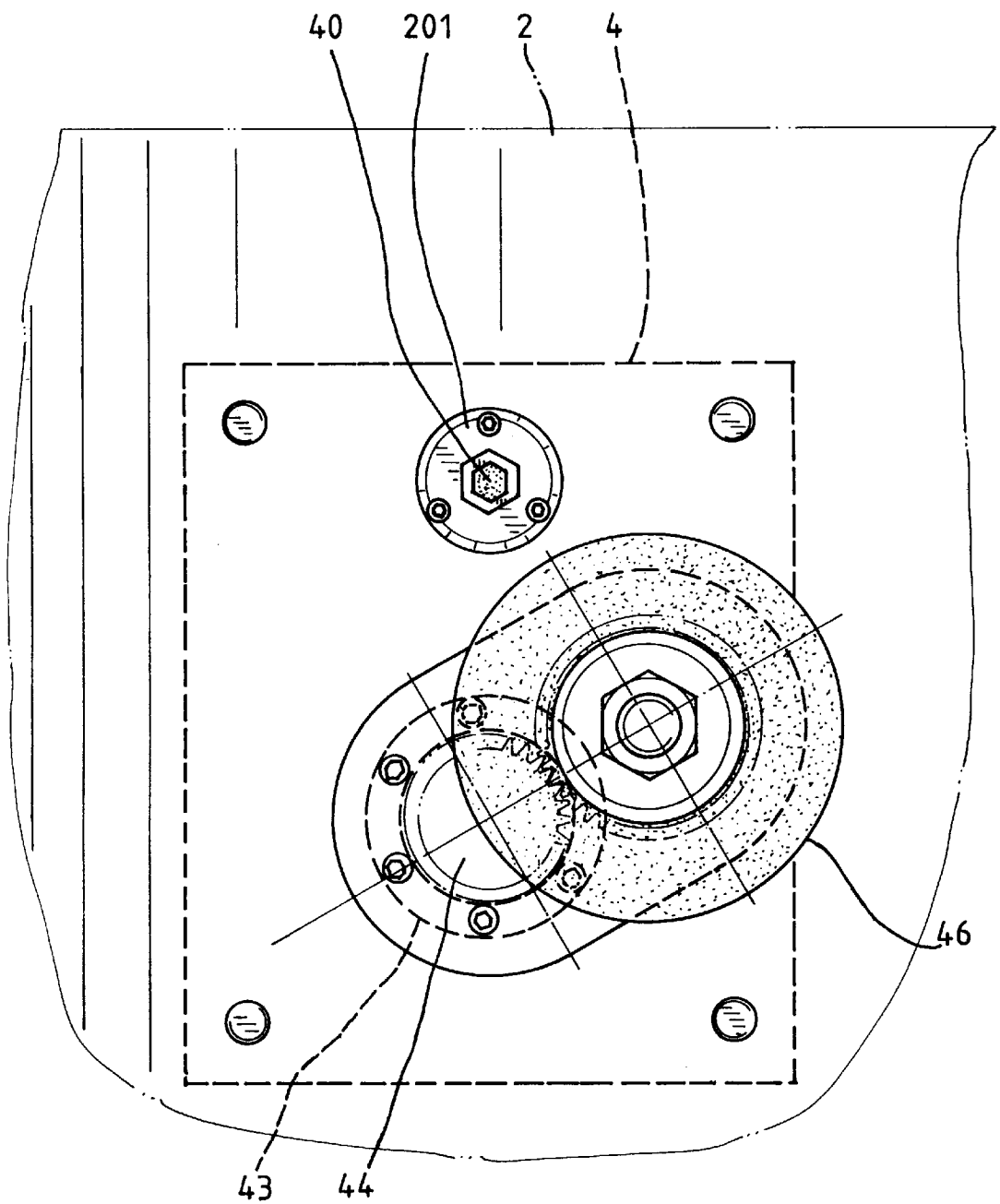
FIG. 15 is an en view in an enlarged scale of a part of the material cut-off shaft assembly according to the present invention.
Figure 16:
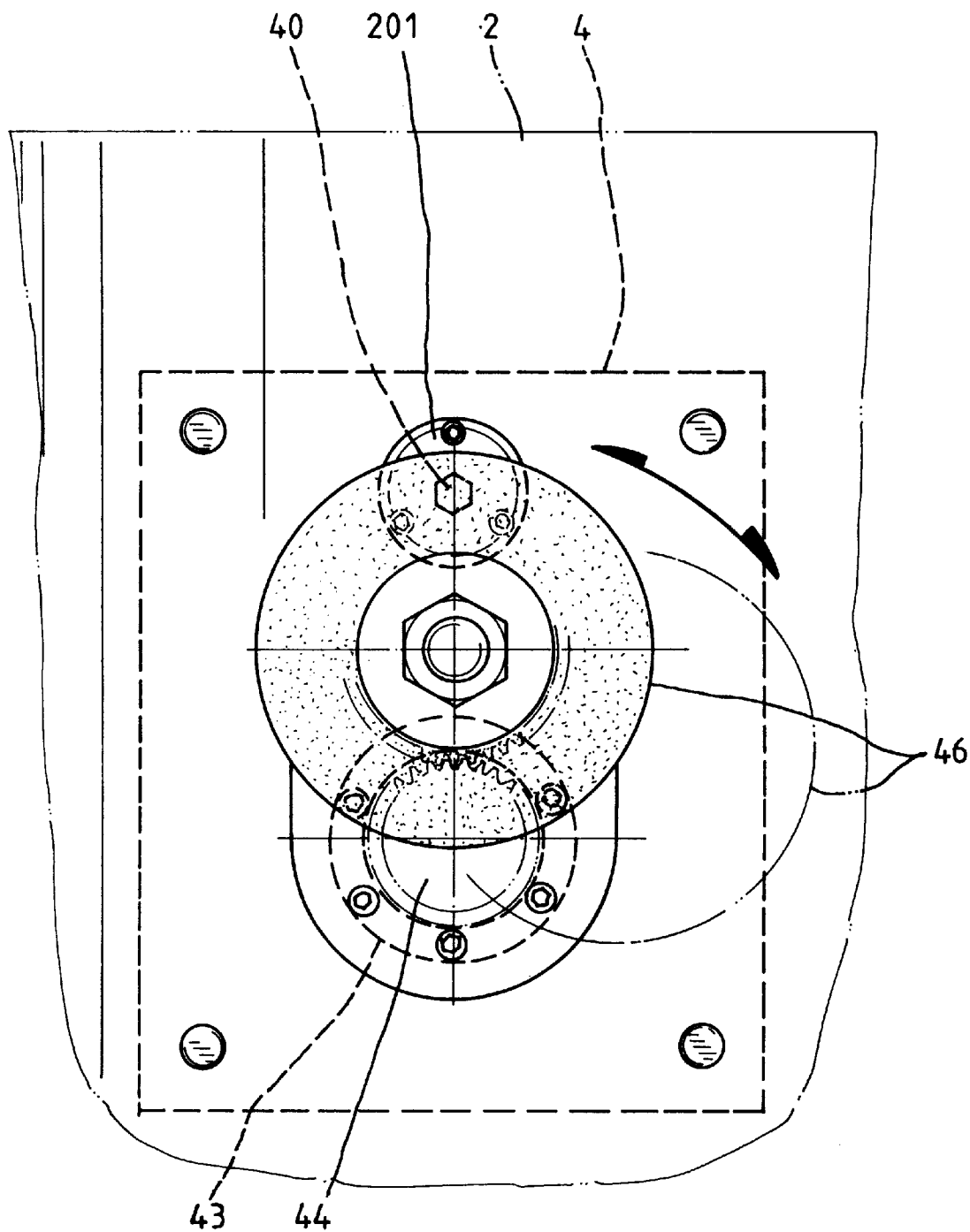
FIG. 16 is similar to FIG. 15 but showing the metal rod material cut.

Referring to FIGS. from 7 through 16, the material cut-off shaft assembly 4 comprises a holder 41, a base frame 42, an axle sleeve 43, a main shaft 44, an auxiliary shaft 45, a cutting tool 46, a toothed ring 47, a toothed block 48, and an actuating cylinder 49. The holder 41 is fixedly mounted on the casing 2 on the outside, having a tubular coupling portion 411, which receives the feed pipe 201. A lock 412 is installed in the tubular coupling portion 411, and controlled to lock the feed pipe 201. A pin 413 is mounted in a hole at the tubular coupling portion 411 and engaged into a sliding groove at the periphery of the feed pipe 201 to limit forward/backward movement of the feed pipe 201 in the tubular coupling portion 411. The front end of the feed pipe 201 is aimed at one fixture 31 at the rotary center fixture holder 3. The base frame 42 is connected to the holder 41 by adjustment screws 60. The motor 50 of the material cut-off shaft assembly 4 is mounted on the base frame 42 at one side opposite to the holder 41. By adjusting the adjustment screws 60 at the base frame 42, the base frame 42 and the motor 50 of the material cut-off shaft assembly 4 are moved forwards or backwards (see FIG. 11). The axle sleeve 43 is connected to the base frame 42 at one side opposite to the motor 50 of the material cut-off shaft assembly 4 (see FIG. 12), and inserted into one through hole 21 at the casing 2. The main shaft 44 is inserted through the axle sleeve 43, and coupled to the motor 50 of the material cut-off shaft assembly 4. The auxiliary shaft 45 is mounted in the casing 2, and connected in parallel to the main shaft 44 through transmission means. The cutting tool 46 is fastened to one end of the auxiliary shaft 45. When the motor 50 of the material cut-off shaft assembly 4 is started, the main shaft 44 and the auxiliary shaft 45 are rotated, thereby causing the cutting tool 46 to be rotated. When the adjustment screws 60 are adjusted, the position of the cutting tool 46 is relatively adjusted. The toothed ring 47 is securely mounted on the axle sleeve 43, having teeth 471 meshed with the toothed block 48, which is fixedly mounted inside the actuating cylinder 49, which is disposed in a vertical position at one side of the axle sleeve 43 (see FIGS. 13 and 14). When the actuating cylinder 49 works, the axle sleeve 43 is turned back and forth, thereby causing the cutting tool 46 to cut off the metal rod material 40 (see FIGS. 15 and 16).

Figure 17:
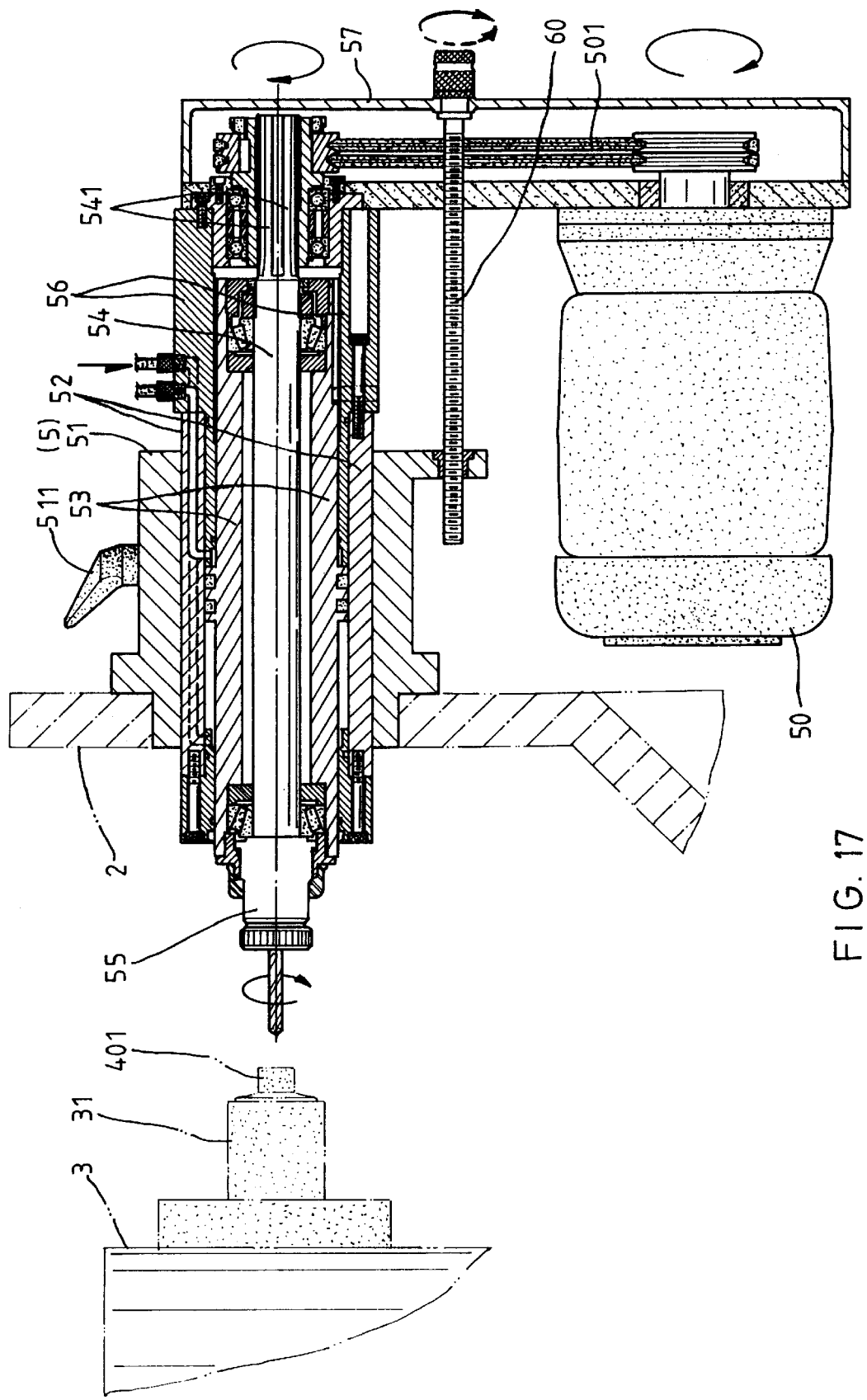
FIG. 17 is sectional view in an enlarged scale of a part of the present invention, showing the structure and operation of one processing shaft assembly.
Figure 18:
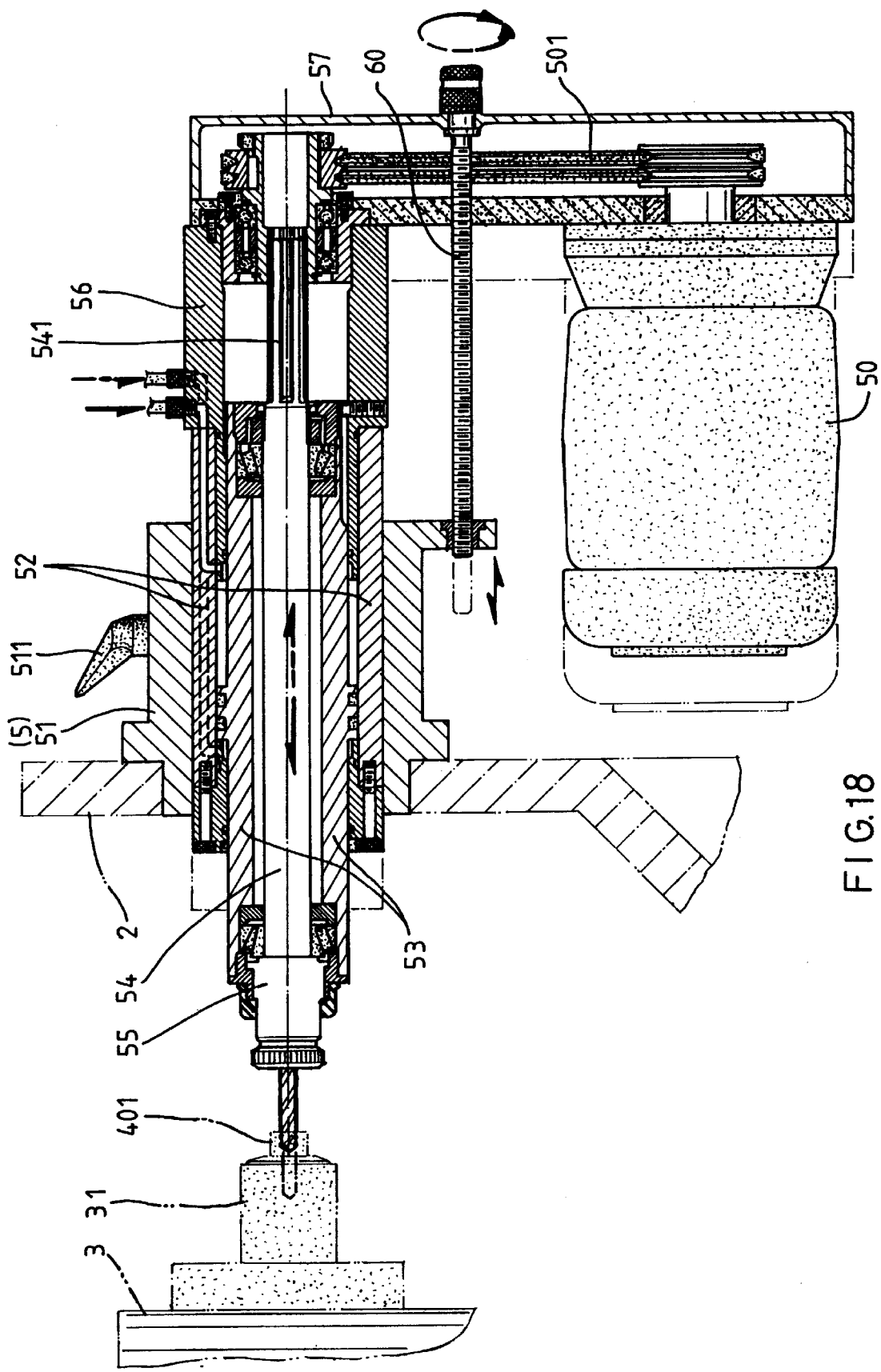
FIG. 18 is similar to FIG. 17 but showing the working tip worked at the workpiece.
Figure 19:
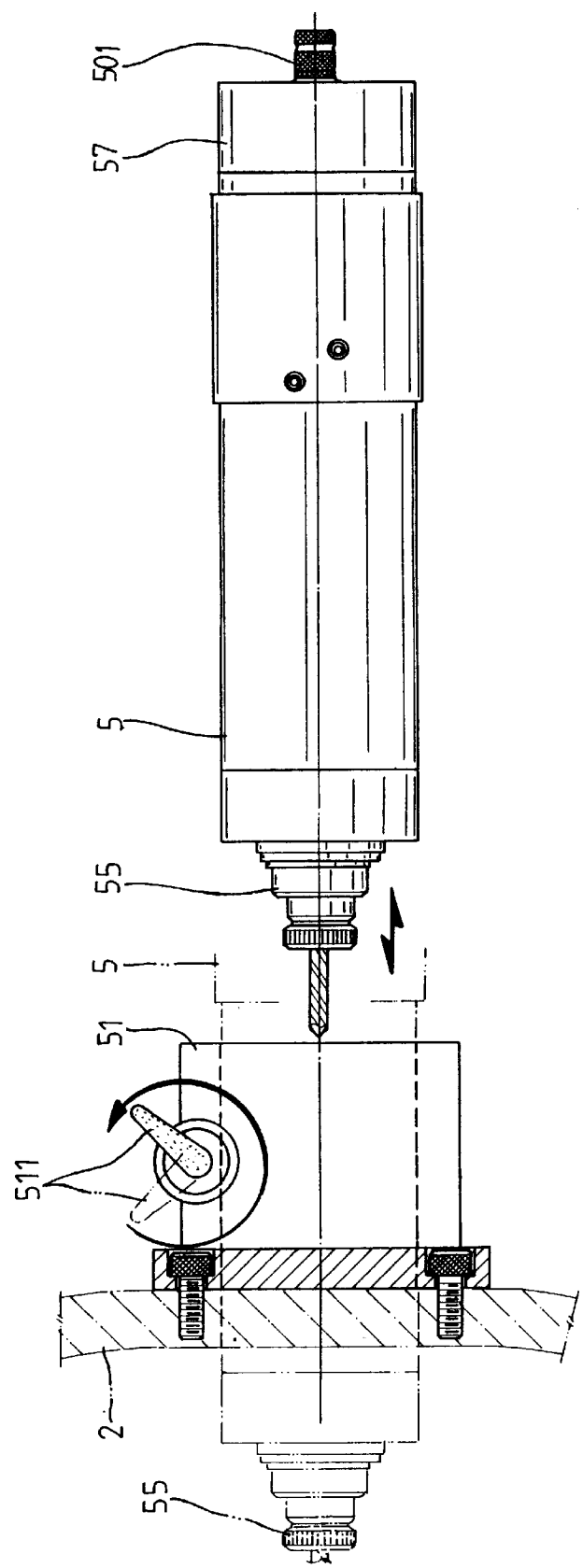
FIG. 19 is an enlarged view of a part of the present invention, showing the processing shaft assembly disconnected from the casing according to the present invention.
Figure 20:
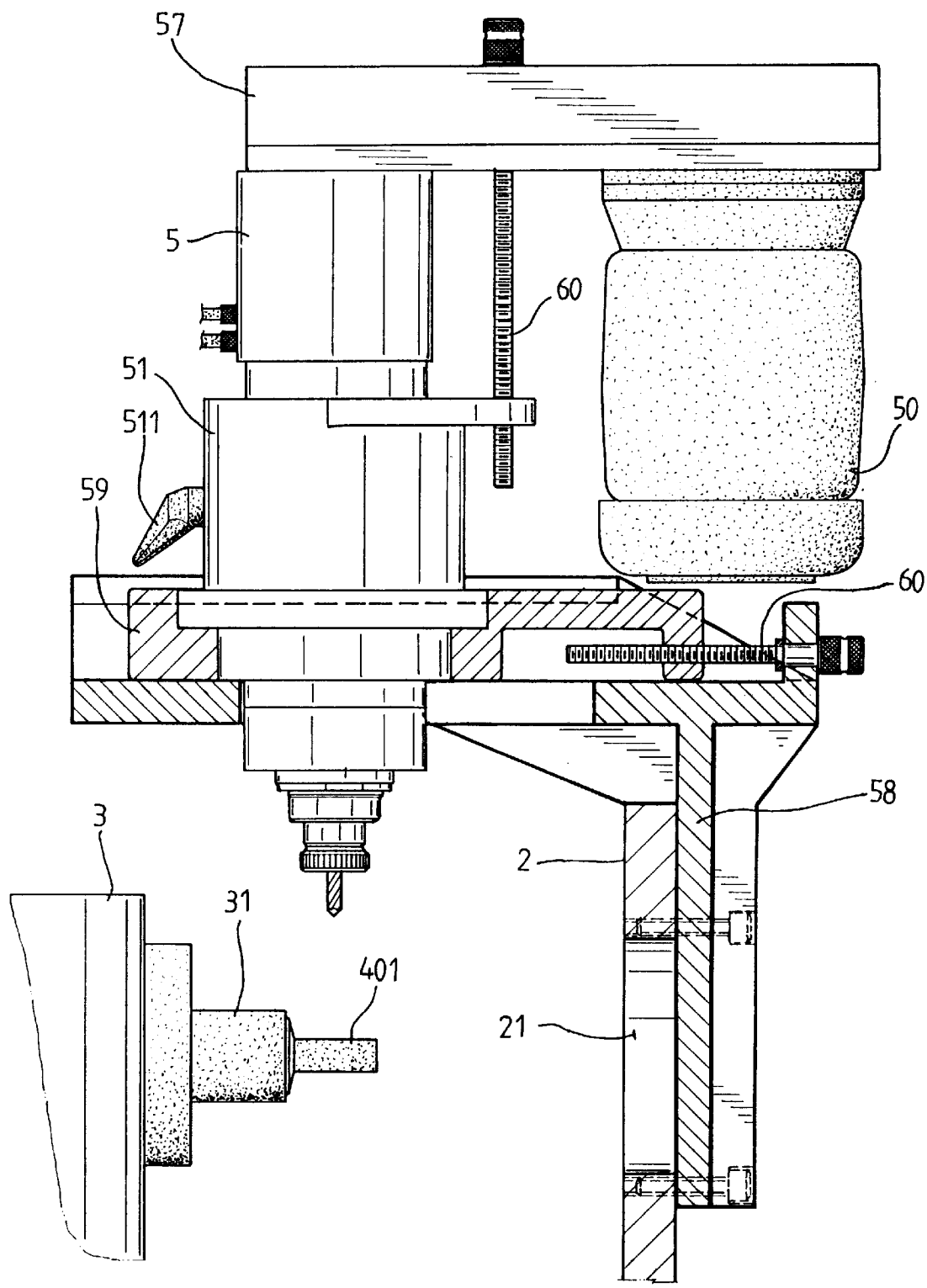
FIG. 20 is a top view in section in an enlarged scale of a part of the present invention, showing the arrangement of the processing shaft assembly at the casing.

Referring to FIGS. from 17 through 20, each of the processing shaft assemblies 5, except the respective motor 50, comprises a hollow cylindrical mounting member 51, a sleeve 52, an inner tube 53, a center shaft 54, a working bit 55, and a rear tube 56 (see FIG. 17). The sleeve 52 is horizontally mounted in the mounting member 51, and connected to the rear tube 56. The center shaft 54 is securely mounted in inner tube 53 inside the sleeve 52. The inner tube 53 is moved forwards/backwards in the sleeve 52 by means of the control of a hydraulic oil system (see FIG. 18). The working bit (for example, a drill point) 55 is fixedly fastened to the front end of the center shaft 54. The center shaft 54 has a key groove 541 near its rear end coupled to the motor 50 of the respective processing shaft assembly 5 through a drive belt 501. The hollow cylindrical mounting member 51 is fastened to a frame 57 by a screw 60. When the screw 60 is disconnected from the hollow cylindrical mounting member 51 and the lock 511 at the hollow cylindrical mounting member 51 is unlocked, the sleeve 52 with the inner tube 53 and the center shaft 54 can then be removed from the hollow cylindrical mounting member 51. The hollow cylindrical mounting member 51 is fastened to the casing 2 by a L-shaped block 58 and a wedge block 59. The L-shaped block 58 and the wedge block 59 are fastened together by a screw 60.

Figure 21:
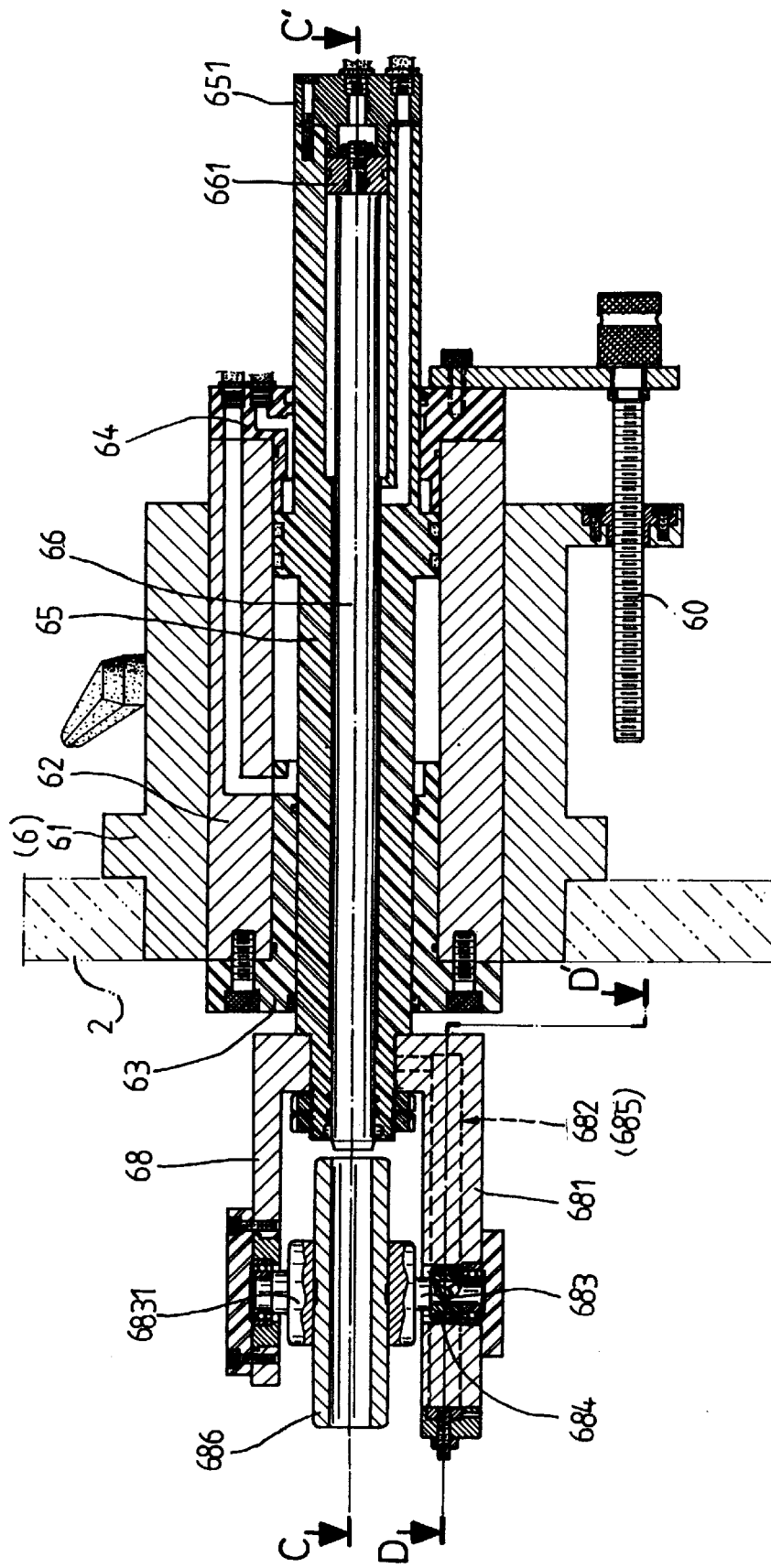
FIG. 21 is a side view in section in an enlarged scale of a part of the present invention, showing the structure of the steering shaft assembly.
Figure 22:
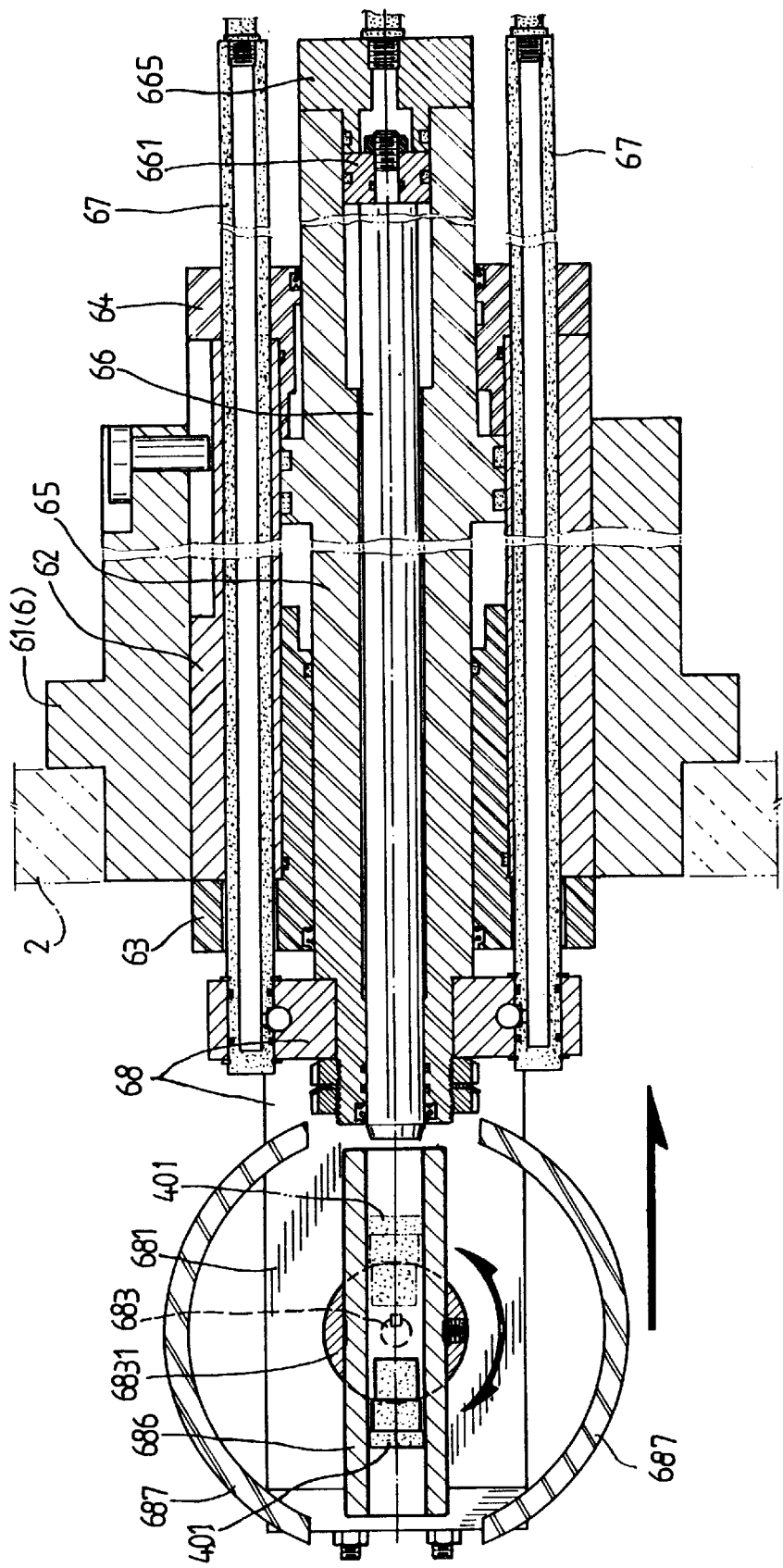
FIG. 22 is a sectional view taken along line C–C' of FIG. 21.
Figure 23:
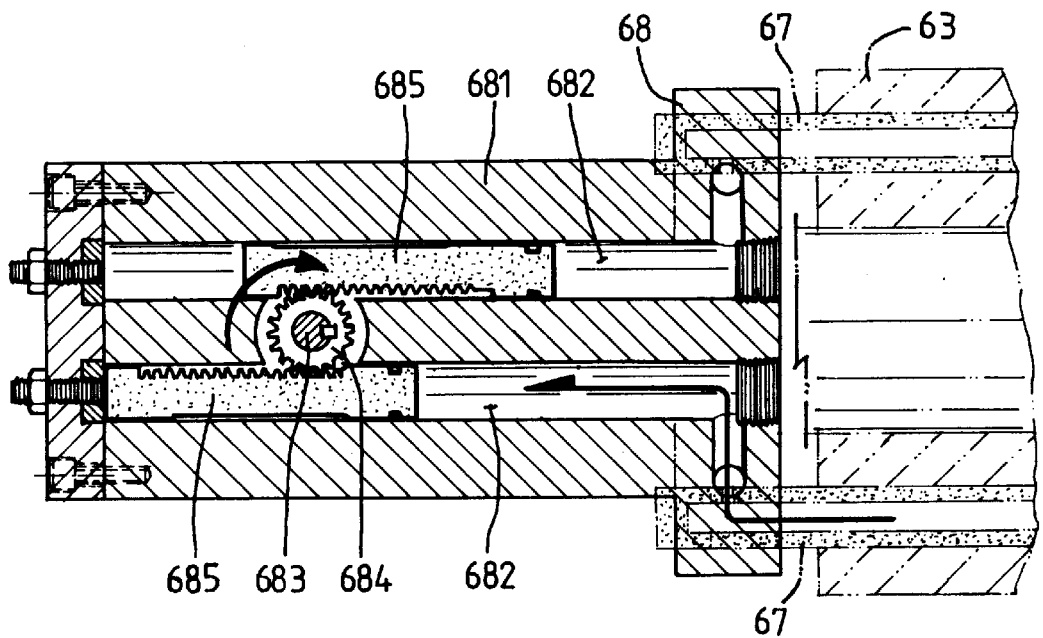
FIG. 23 is a sectional view taken along line D–D' of FIG. 21.
Figure 24:
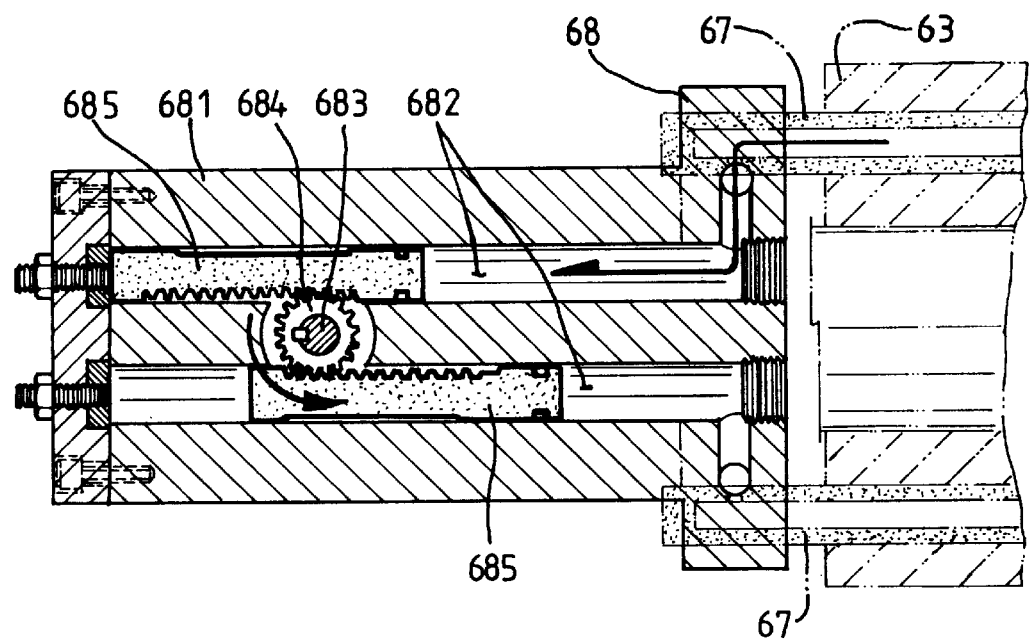
FIG. 24 is similar to FIG. 23 but showing the racks reversed.
Figure 25:
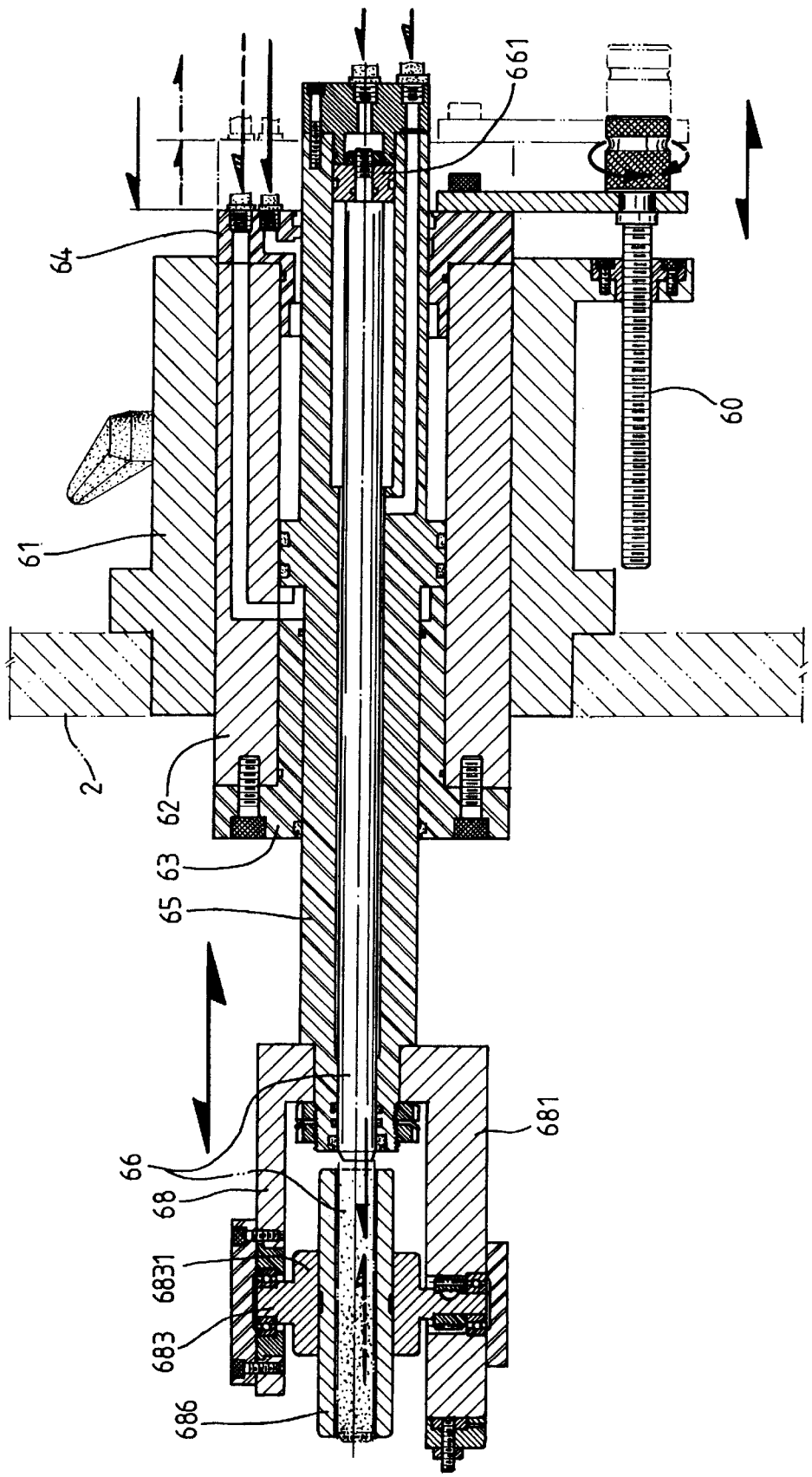
FIG. 25 is similar to FIG. 21 but showing the steering shaft assembly operated.
Figure 26:
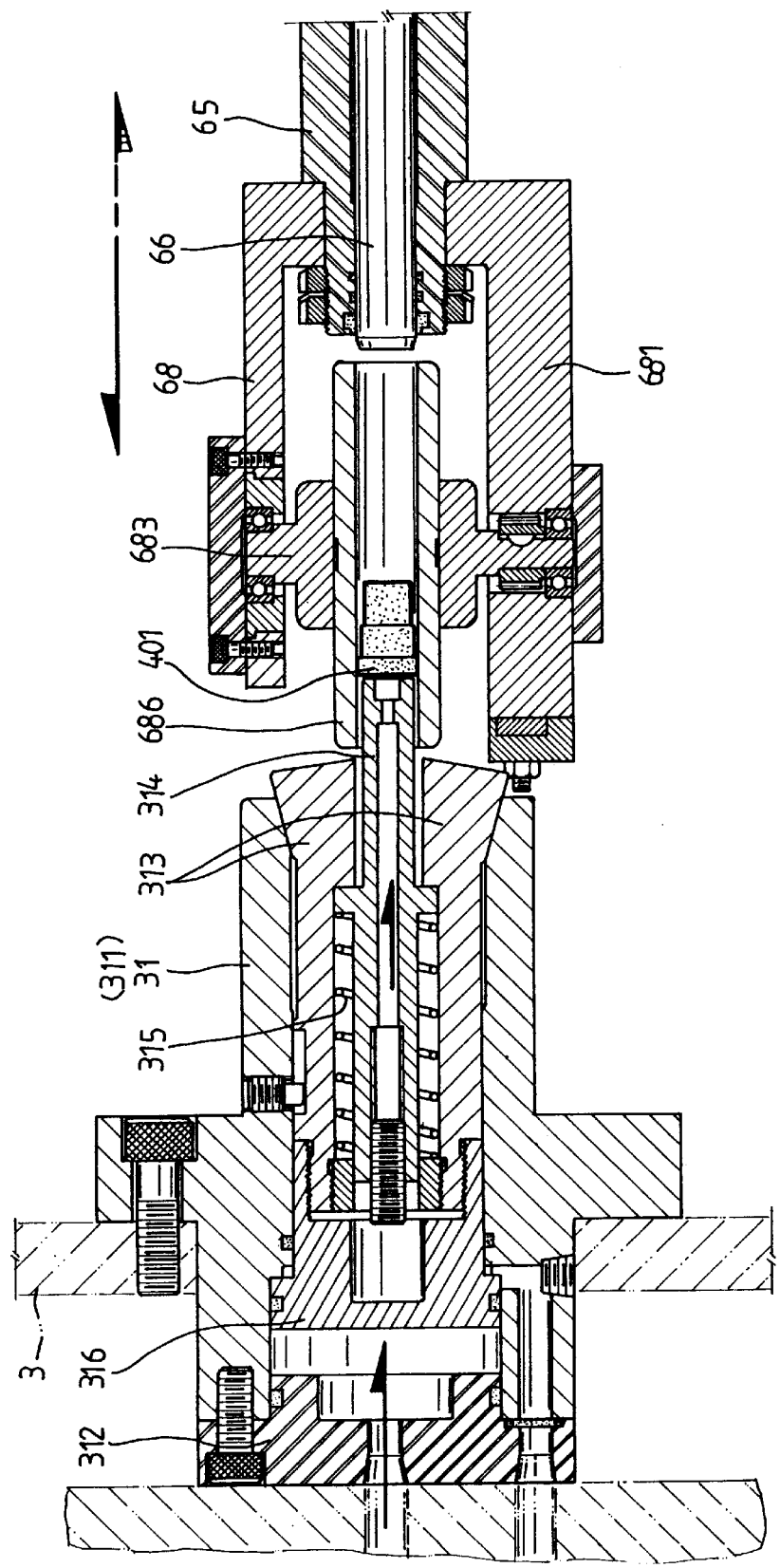
FIG. 26 is a sectional view in an enlarged scale of a part of the present invention, showing the steering shaft assembly moved to the fixture.
Figure 27:
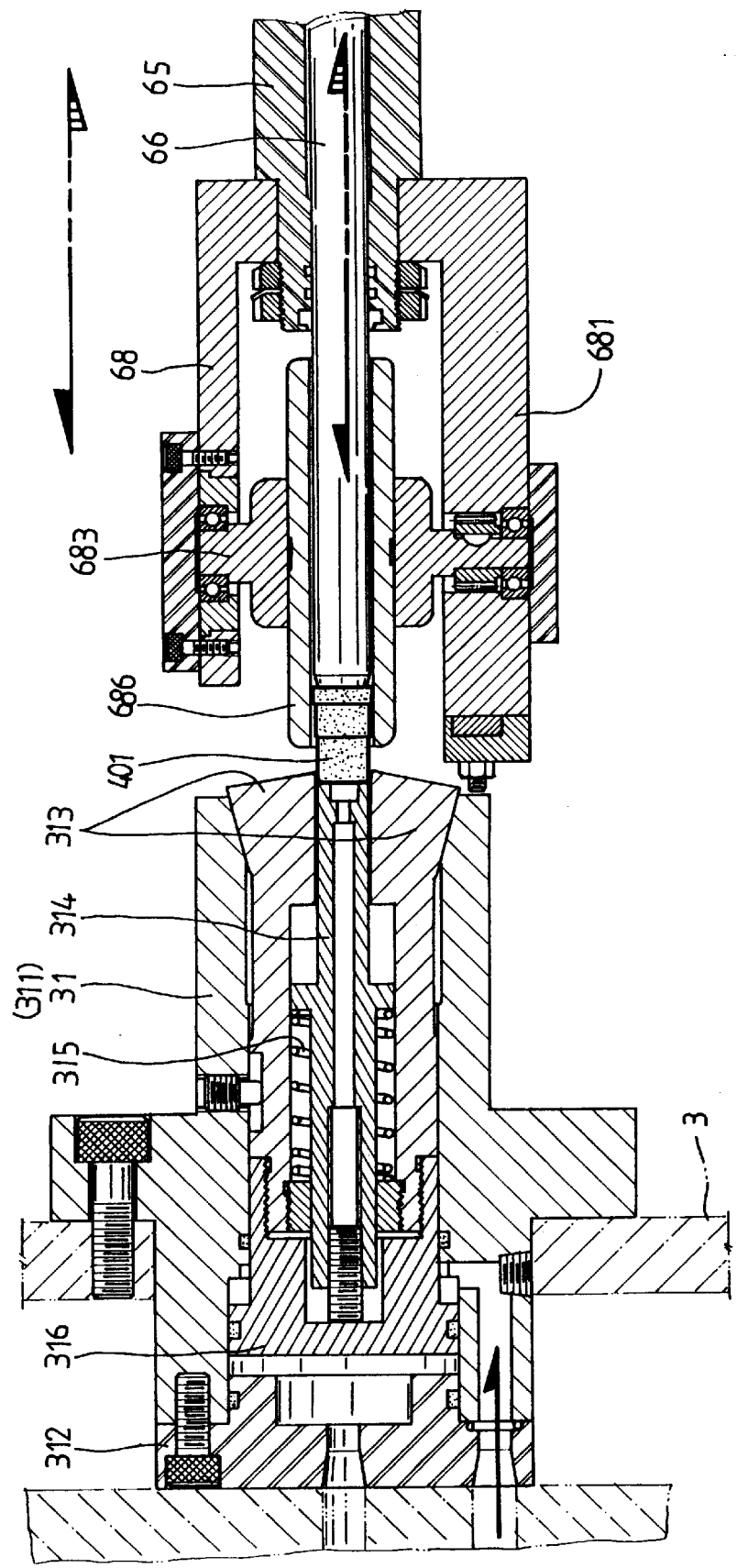
FIG. 27 is similar to FIG. 26 but showing the position of the workpiece reversed.
Figure 28:
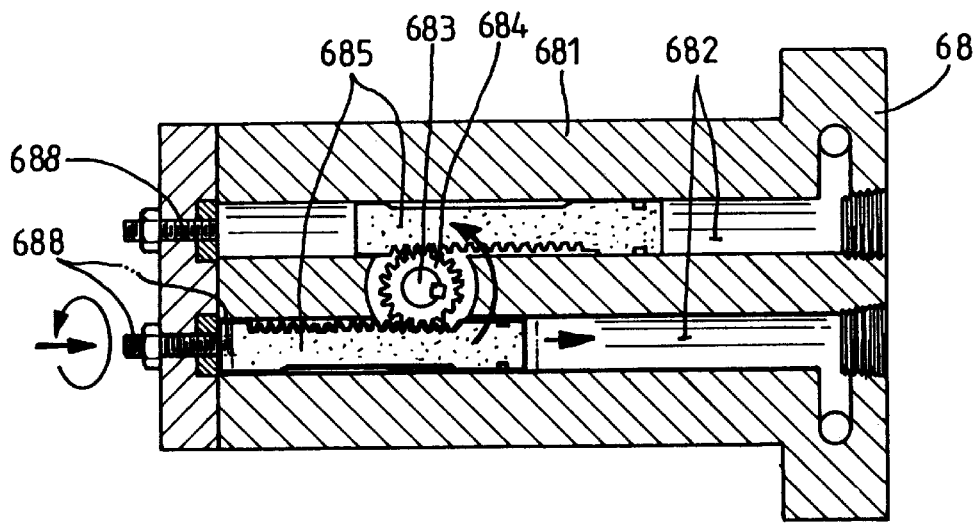
FIG. 28 is a sectional view in an enlarged scale of a part of the C-shaped holder, showing the adjustment of the adjustment screws according to the present invention.
Figure 29:
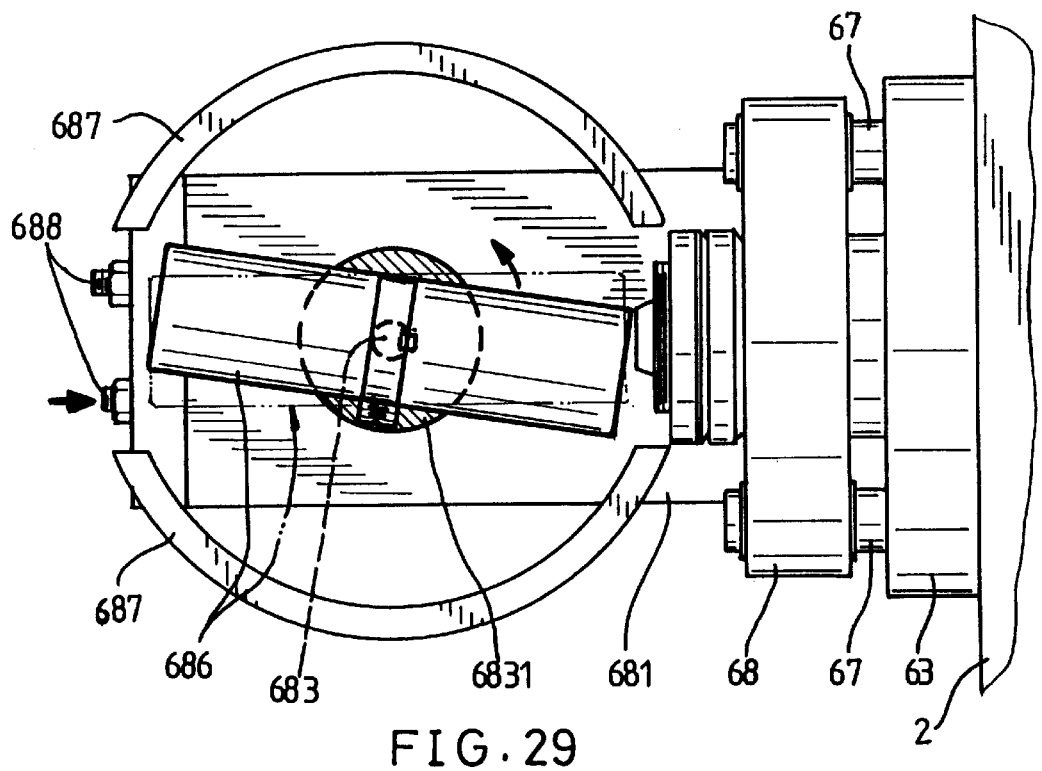
FIG. 29 illustrates the angular position of the workpiece pick-up tube of the steering shaft assembly changed according to the present invention.

Referring to FIGS. from 21 through 29, the steering shaft assembly 6 comprises a mounting frame 61 mounted in one through hole 21 at the casing 2, a hollow base member 62 mounted within the mounting frame 61, a front insert 63, a rear insert 64, a hollow main shaft 65, a center rod 66, two side tubes 67, and a C-shaped holder 68 (see FIGS. 21 and 22). The hollow main shaft 65 is inserted into the hollow base member 62. The center rod 66 is inserted into the hollow main shaft 65. The front insert 63 and the rear insert 64 are respectively inserted into the hollow base member 62 from two opposite sides to fix the hollow main shaft 65 and the center rod 66 in place. The hollow main shaft 65 and the center rod 66 have a respective rear locating block 651; 661 for the positioning of hydraulic oil piping. The side tubes 67 are inserted through respective axially extended through holes at the hollow base member 62, the front insert 63, the rear insert 64 and the C-shaped holder 68, and bilaterally arranged in parallel for guiding hydraulic oil to the C-shaped holder 68 (see FIGS. 22, 23 and 24). The C-shaped holder 68 comprises a bottom block 681, two oil chambers 628 defined inside the bottom block 681 and respectively connected to the side tubes 67 to receive hydraulic oil therefrom, a rotary shaft 683 revolvably supported on the bottom block 681 between the oil chambers 628, a gear 684 fixedly mounted on the rotary shaft 683, two racks 685 respectively mounted in the oil chambers 682 and meshed with the gear 684 at two opposite sides. Hydraulic oil is alternatively guided in and out the oil chambers 682 to reciprocate the racks 685 in reversed directions, causing the rotary shaft 683 to be alternatively turned clockwise and counterclockwise within 180° angle. The rotary shaft 683 has a flank 6831. A workpiece pick-up tube 686 is mounted in a through hole at the flank 6831, and aligned between the center rod 66 and one fixture 31 at the rotary center fixture holder 3, so that the center rod 66 can be inserted into the workpiece pick-up tube 686. Two guard plates 687 are provided at two opposite sides of the workpiece pick-up tube 686. The rear insert 64 can be moved axially relative to the mounting frame 61 by means of rotating a respective adjustment screw 60 (see FIG. 25). When one fixture 31 is aimed at the steering shaft assembly 6, the center rod 66, the hollow main shaft 65 and the C-shaped holder 68 are moved forwards to the fixture 31, and then the fixture 31 is controlled to release the workpiece 401, enabling the workpiece 401 to fall to the workpiece pick-up tube 686 (see FIG. 26). Then, the hollow main shaft 65 is moved backwards, and then hydraulic oil is controlled to flow through the side tubes 67 into the oil chambers 682, enabling the workpiece pick-up tube 686 to be turned with the rotary shaft 683 through 180° angle (see FIG. 22), and then the main shaft 65 is moved forwards again, enabling the primarily processed workpiece 401 to be inserted into the fixture 31 at the rotary fixture holder 3 (see FIG. 27). Thereafter, the center rod 66 is moved back with the main shaft 65, and the primarily processed workpiece 401 is secondarily processed by the next processing shaft assembly 5. This procedure is repeated again and again. After all designed processing procedures have been done, the finished workpiece 401 is delivered to the finished product output port 22 (see FIG. 2). Further, two adjustment screws 688 are respectively threaded into a respective screw hole at the front side of the bottom block 681 to adjust the stroke of the respective rack 685 (see FIGS. 23, 28 and 29).

Figure 30:
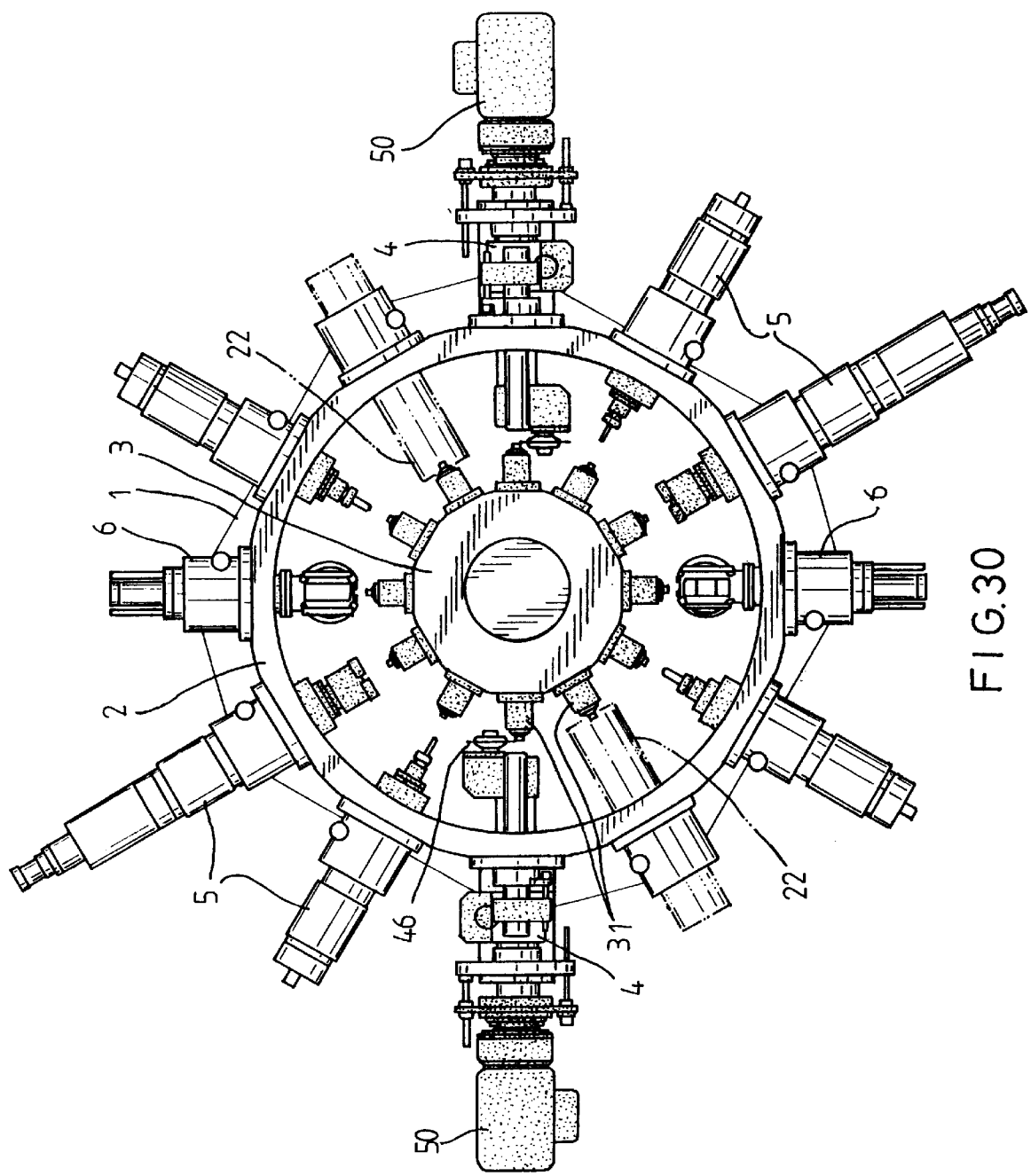
FIGS. 30 and 31 are top view in an enlarged scale of the present invention, showing the arrangement of the processing shaft assemblies, the material cut-off shaft assembly and the steering shaft assembly at the casing.
Figure 31:
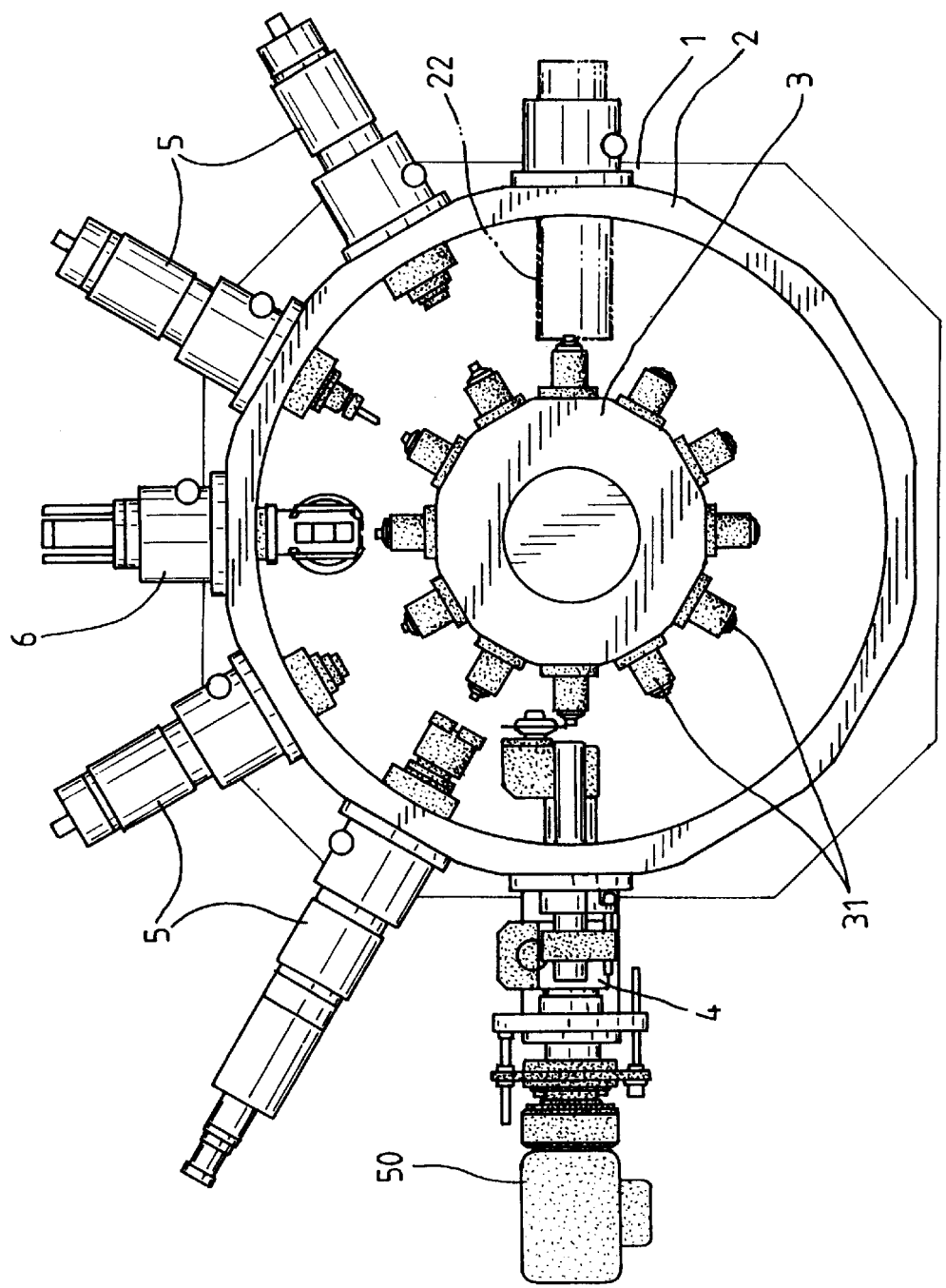

The operation of the material cut-off shaft assembly 4, the processing shaft assemblies 5 and the steering shaft assembly 6, and the respective functions of the processing shaft assemblies 5 are determined subject to the type of the desired finished products 401 to be made. During operation, metal rod material 40 is delivered forwards the material feed unit 20, then properly cut by the material cut-off shaft assembly 4, and then carried by the fixtures 31 of the rotary center fixture holder 3 to each of the processing shaft assemblies 5 in proper order to receive a respective processing procedure, and then carried by the steering shaft assembly 6 to the product output port 22. During processing, waste material falls to the waste material conveyer 30, and then carried out of the machine base 1. As shown in FIGS. 30 and 31, the processing shaft assemblies 5 and the steering shaft assembly 6 can easily be disconnected from the casing 2, and then shifted to different locations at the casing 2. The number of the processing shaft assemblies 5 may be changed subject to the type of the finished product 401 to be made.

While only one embodiment of the present invention has been shown and described, it will be understood that various modifications and changes could be made thereunto without departing from the spirit and scope of the invention disclosed.

What the invention claimed is:

1. A fully automatic cutting metal-working machine comprising a material feed unit having a material feed pipe controlled to deliver metal rod material for processing into finished products, a circular cutting metal-working main unit controlled to process metal rod material from said material feed unit into finished products, a waste material conveyer controlled to collect and carry waste material out of said circular cutting metal-working main unit, and a control box which controls the operation of said material feed unit, wherein said circular cutting metal-working main unit comprises:

a hollow, cylindrical machine base;

a casing fixedly mounted on said machine base at a top side, said casing comprising a plurality of through holes and a finished product output port equiangularly spaced around the periphery thereof;

a rotary center fixture holder mounted inside said casing at the center, said rotary center fixture holder comprising a plurality of fixtures equiangularly spaced around the periphery thereof and controlled to carry workpiece from said material feed unit to processing shaft assemblies for processing;

a material cut-off shaft assembly mounted in one of the through holes at said casing and controlled to cut metal rod material fed by said material feed unit into workpieces, enabling obtained workpieces to be carried by said fixtures of said rotary center fixture holder to processing shaft assemblies for processing, said material cut-off shaft assembly comprising a holder, a motor, a base frame, an axle sleeve, a main shaft, an auxiliary shaft, a cutting tool, a toothed ring, a toothed block, and an actuating cylinder, said holder of said material cut-off shaft assembly being fixedly mounted on said casing on the outside and having a tubular coupling portion, which receives the feed pipe of said material feed unit, said base frame being connected to the holder of said cut-off shaft assembly by adjustment screws, the motor of said material cut-off shaft assembly being mounted on said base frame at one side opposite to the holder of said material cut-off shaft assembly, the adjustment screws at the base frame of said cut-off shaft assembly been turned to move the base frame and motor of said material cut-off shaft assembly forwards or backwards, said axle sleeve being connected to the base frame of said material cut-off shaft assembly at one side opposite to the motor of said material cut-off shaft assembly and inserted into one through hole at said casing, the main shaft of said material cut-off shaft assembly being inserted through said axle sleeve and coupled to the motor of said material cut-off shaft assembly, said auxiliary shaft being mounted in said casing and driven to rotate by the main shaft of said material cut-off shaft assembly, said cutting tool being fastened to one end of said auxiliary shaft and rotated when the main shaft and auxiliary shaft of said material cut-off shaft assembly are rotated by the motor of said material cut-off shaft assembly, said toothed ring being securely mounted on said axle sleeve and meshed with said toothed block, which is fixedly mounted inside said actuating cylinder, which is disposed in a vertical position at one side of said axle sleeve, said axle sleeve being turned back and forth when said actuating cylinder works, thereby causing said cutting tool to cut off the metal rod material fed by said material feed unit;

a set of processing shaft assemblies respectively mounted in the through holes at said casing and controlled for processing workpieces carried by said fixtures, said processing shafts each comprising a hollow cylindrical mounting member respectively mounted in the through holes at said casing, and lock means provided at said hollow cylindrical mounting member for locking said hollow cylindrical mounting member in the respective through hole at said casing; and a steering shaft assembly mounted in one of the through holes at said casing and controlled to reverse the position of workpiece at each of the fixtures of said rotary center fixture holder, said steering shaft assembly comprising a mounting frame mounted in one through hole at said casing, a hollow base member mounted within said mounting frame, a front insert, a rear insert, a hollow main shaft inserted into said hollow base member, a center rod inserted into said hollow main shaft, two side tubes, and a C-shaped holder, said front insert and said rear insert being respectively inserted into said hollow base member from two opposite sides to fix said hollow main shaft and said center rod in place, said hollow main shaft and said center rod having a respective rear locating block connected with hydraulic oil piping, said side tubes being inserted through respective axially extended through holes at said hollow base member, said front insert, said rear insert and said C-shaped holder and bilaterally arranged in parallel for guiding hydraulic oil to said C-shaped holder, said C-shaped holder comprising a bottom block, two oil chambers defined inside said bottom block and respectively connected to said side tubes to receive hydraulic oil from a hydraulic system through said side tubes, a rotary shaft revolvably supported on said bottom block between said oil chambers, a gear fixedly mounted on said rotary shaft, two racks respectively mounted in said oil chambers and meshed with said gear at two opposite sides and reciprocated in reversed directions to rotate said gear and said rotary shaft forwards and backwards within a 180° angle by means of the control of the hydraulic system, said rotary shaft having a flank, and a workpiece pick-up tube intersected with said flank and aligned between said center rod and one fixture at said rotary center fixture holder for receiving said center rod;

wherein when one fixture of said rotary center fixture holder is aimed at said steering shaft assembly, the center rod, hollow main shaft and C-shaped holder are moved forward toward the fixture, and then the fixture is controlled to release the workpiece held therein, enabling the workpiece to fall to said workpiece pick-up tube, and then said hollow main shaft is moved backwards, and then hydraulic oil is controlled to flow through said side tubes into said oil chambers, enabling said workpiece pick-up tube to be turned with said rotary shaft through a 180° angle, and then the main shaft of said steering shaft assembly is moved forwards again, enabling the workpiece to be inserted into the fixture again, and then said center rod is moved back with the main shaft of said steering shaft assembly, and the workpiece is carried by the respective fixture of said rotary center fixture holder to the other processing shaft assemblies and processed into finished product by the other processing shaft assemblies one after another, and then the finished product is carried to said finished product output port by the respective fixture.

2. The fully automatic cutting metal-working machine of claim 1 wherein the holder of said material cut-off shaft assembly comprises a tubular coupling portion, and a lock installed in said tubular coupling portion of the holder of said material cut-off shaft assembly and controlled to lock said feed pipe in said tubular coupling portion, said feed pipe comprising a fixed locating block fastened to the holder of said material cut-off shaft assembly by an adjustment screw, which is rotated to move said feed pipe forwards/backwards in said tubular coupling portion when said lock is unlocked.

3. The fully automatic cutting metal-working machine of claim 1 wherein a pin is mounted in a hole at the tubular coupling portion of said material cut-off shaft assembly and engaged into a sliding groove at the periphery of said feed pipe to limit forward/backward movement of said feed pipe in said tubular coupling portion.

4. The fully automatic cutting metal-working machine of claim 1 wherein the hollow cylindrical mounting member of each of said processing shaft assemblies is respectively fastened to said casing by a L-shaped block and a wedge block, said L-shaped block and said wedge block being fastened together by a screw.

5. The fully automatic cutting metal-working machine of claim 1 wherein two guard plates are provided at two opposite sides of said workpiece pick-up tube for protection.

6. The fully automatic cutting metal-working machine of claim 1 wherein two adjustment screws are respectively threaded into a respective screw hole at a front side of the bottom block of said C-shaped holder of said steering shaft assembly to adjust the stroke of said racks.

* * * * *